United States Patent [19]

Flurry

[11] Patent Number: 5,291,608
[45] Date of Patent: Mar. 1, 1994

[54] DISPLAY ADAPTER EVENT HANDLER WITH RENDERING CONTEXT MANAGER

[75] Inventor: Gregory A. Flurry, Austin, Tex.

[73] Assignee: International Business Machines Corporation, Armonk, N.Y.

[21] Appl. No.: 973,940

[22] Filed: Nov. 10, 1992

Related U.S. Application Data

[63] Continuation of Ser. No. 819,616, Jan. 9, 1992, abandoned, which is a continuation of Ser. No. 480,182, Feb. 13, 1990, abandoned.

[51] Int. Cl.$^5$ .............................................. G06F 11/00
[52] U.S. Cl. ........................... 395/725; 364/DIG. 1; 364/230.2; 364/231.5; 364/237.2; 364/238.1; 364/238.2; 364/241.4; 364/242.2
[58] Field of Search ............... 395/725, 325, 650, 725, 395/325, 650

[56] References Cited

U.S. PATENT DOCUMENTS

| | | | |
|---|---|---|---|
| 4,159,516 | 6/1979 | Henrion et al. | 395/275 |
| 4,348,743 | 9/1982 | Dozier | 395/550 |
| 4,438,489 | 3/1984 | Heinrich et al. | 395/725 |
| 4,455,602 | 6/1984 | Baxter et al. | 395/775 |
| 4,482,954 | 11/1984 | Vrielink et al. | 395/725 |
| 4,630,041 | 12/1986 | Casamatta et al. | 395/725 |
| 4,638,432 | 1/1987 | Niblock et al. | 395/725 |
| 4,641,308 | 2/1987 | Sacarisen et al. | 371/16.1 |
| 4,658,351 | 4/1987 | Teng | 395/650 |
| 4,744,048 | 5/1988 | Blanset et al. | 395/400 |
| 4,747,048 | 5/1988 | Blanset et al. | 395/650 |
| 4,777,591 | 10/1988 | Chang et al. | 395/800 |
| 4,816,990 | 3/1989 | Williams | 395/650 |
| 4,914,583 | 4/1990 | Weisshaar et al. | 395/650 |
| 4,930,068 | 5/1990 | Katayose et al. | 395/725 |
| 4,959,781 | 9/1990 | Rubenstein et al. | 395/725 |
| 5,075,847 | 12/1991 | Fromme | 395/700 |
| 5,193,187 | 3/1993 | Strout, II et al. | 395/650 |

OTHER PUBLICATIONS

Computer Graphics, vol. 22, No. 4, Aug., 1988, pp. 247-253, entitled "Virtual Graphics" by Voorhies, Kirk and Lathrop.

Computer Graphics, vol. 23, No. 3, Jul., 1989, pp. 61-67, entitled "Hardware Acceleration for Window Systems" by Rhoden and Wilcox.

IBM Technical Disclosure Bulletin, vol. 30, No. 1, Jun., 1987, pp. 40-43, entitled "Virtual Machine Interface/Virtual Resource Manager".

IBM Technical Disclosure Bulletin, vol. 28, No. 8, Jan., 1986, pp. 3248-3249, entitled "Screen-Sharing Ring for Enhanced Multiple Application Display".

IBM Technical Disclosure Bulletin, vol. 25, No. 8, Jan., 1983, pp. 4390-4392, entitled "Asynchronous Data Transfer Buffer for MP Systems".

IBM Technical Disclosure Bulletin, vol. 28, No. 12, May, 1986, pp. 5209-5210, entitled "Hardware Display Windowing System".

IBM Technical Disclosure Bulletin, vol. 27, No. 5, Oct., 1984, pp. 2905-2907, entitled "Multiprocessor System to Improve Context Switching".

IBM Technical Disclosure Bulletin, vol. 24, No. 6, Nov., 1981, pp. 2782-2785, enntitled "Multi-Tasking Using Coequal Multiple Microprocessors Having Memory-Lock Facilities".

*Primary Examiner*—Michael R. Fleming
*Assistant Examiner*—Ayaz R. Sheikh
*Attorney, Agent, or Firm*—Thomas E. Tyson; Mark E. McBurney

[57] ABSTRACT

A data processing system that executes a process and further includes the capability to provide an interrupt signal upon the occurrence of a predetermined event. An interrupt manager is provided that includes the capability to receive the interrupt signal and provide data indicative of the occurrence of the interrupt signal. Further the interrupt manager includes the capability to evaluate this data according to a predetermined criteria to determine if an event signal should be provided to a process. Lastly, a capability for providing the event signal only when initiated by the evaluating process is provided.

13 Claims, 22 Drawing Sheets

GRAPHICS_SYSTEM_CALL (Device, Command, Data)

Device = Indicates the specific display device

Command = the specific function to perform
(e. g., MAKE_GP, CREATE_RCS, etc.)

Data = Function specific data structure
(e. g., for CREATE_RCX the structure has the following fields:
error code, domain number on device,
pointer to device specific data structure,
length of device specific data structure,
identifier for rendering context created
(use to reference RCX on subsequent calls to
GRAPHICS_SYSTEM_CALL))

FIG. 4

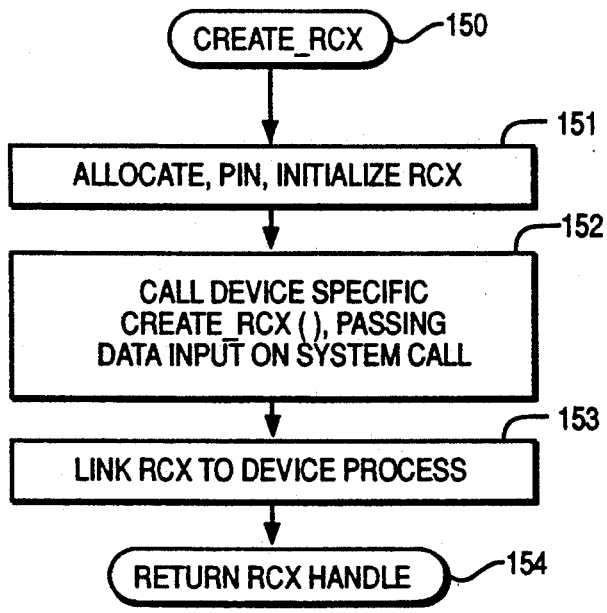

FIG. 8

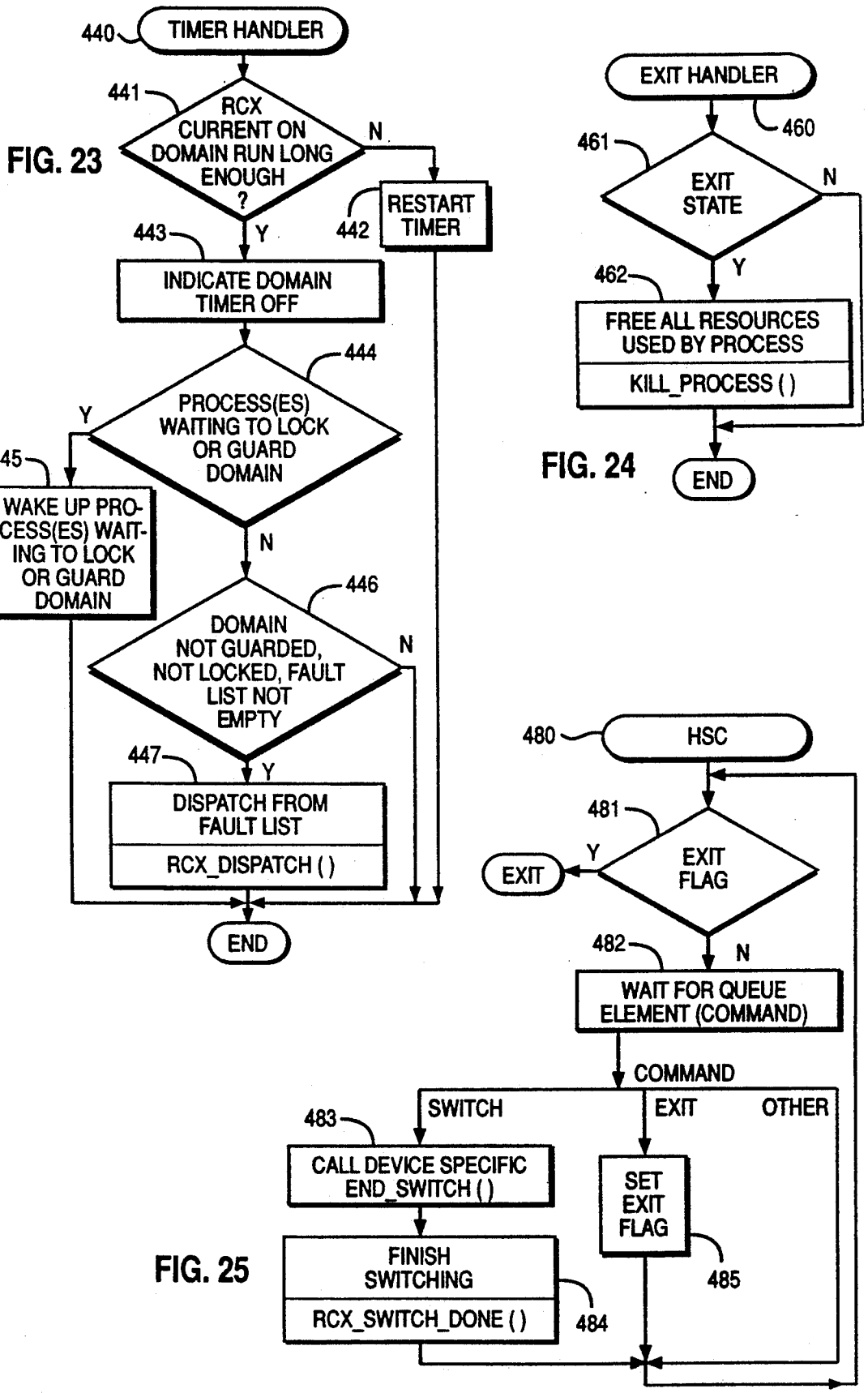

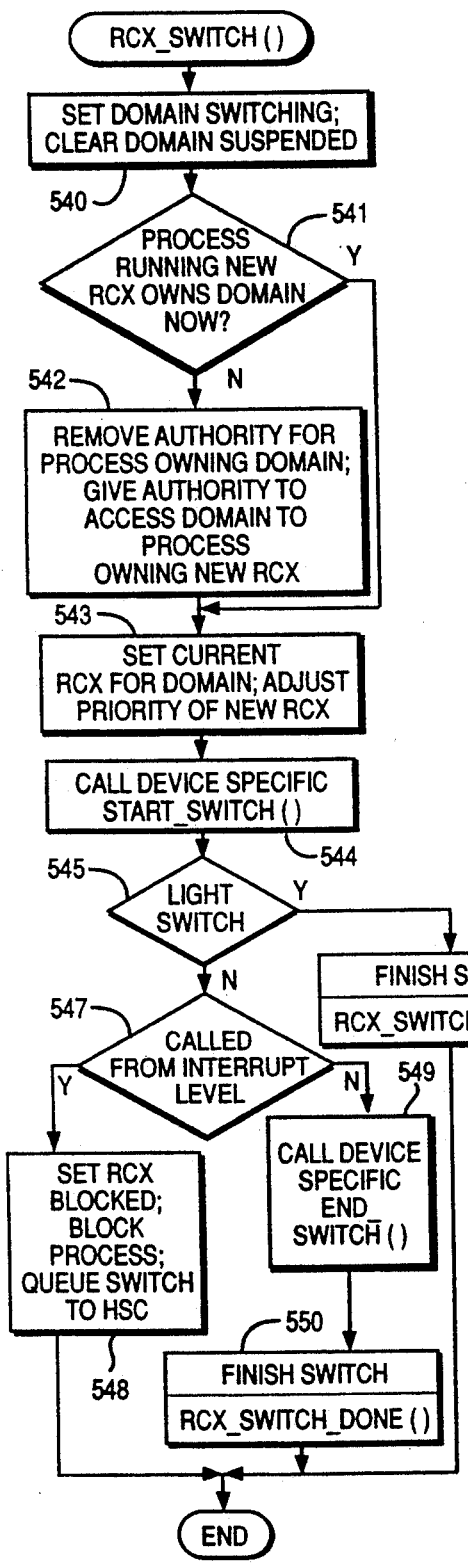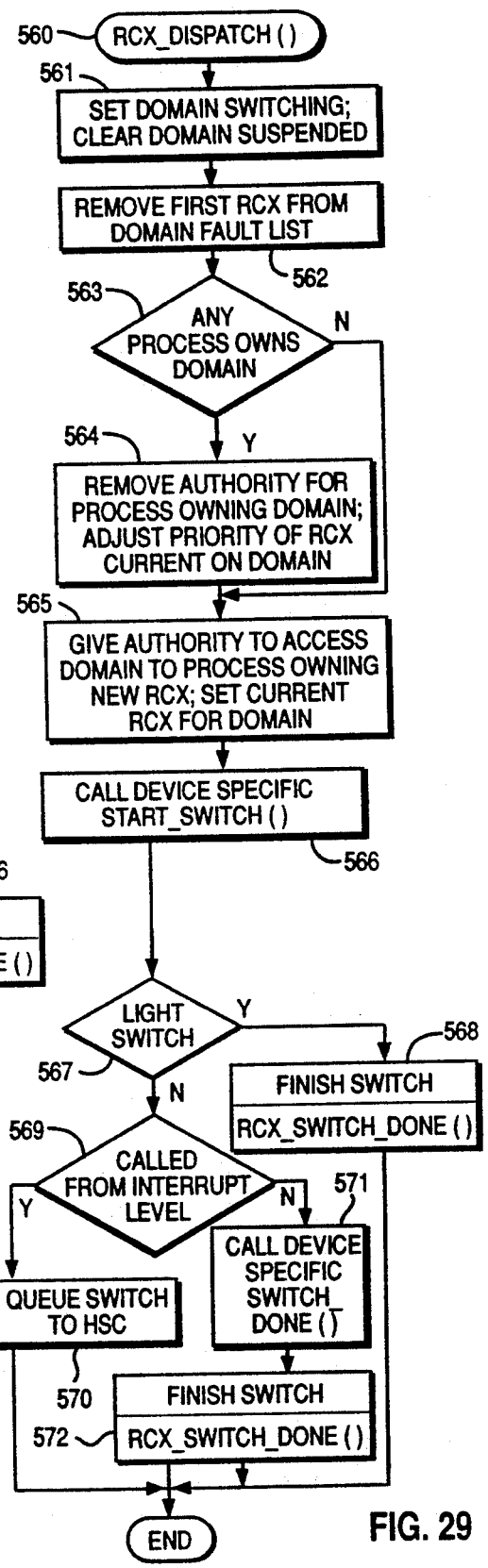
FIG. 28
FIG. 29

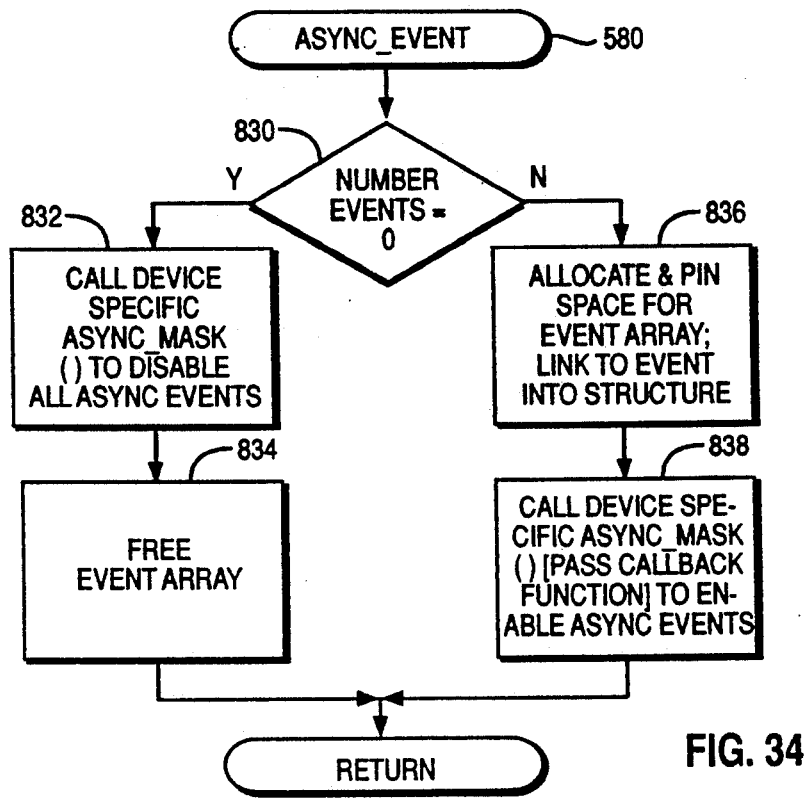
FIG. 34
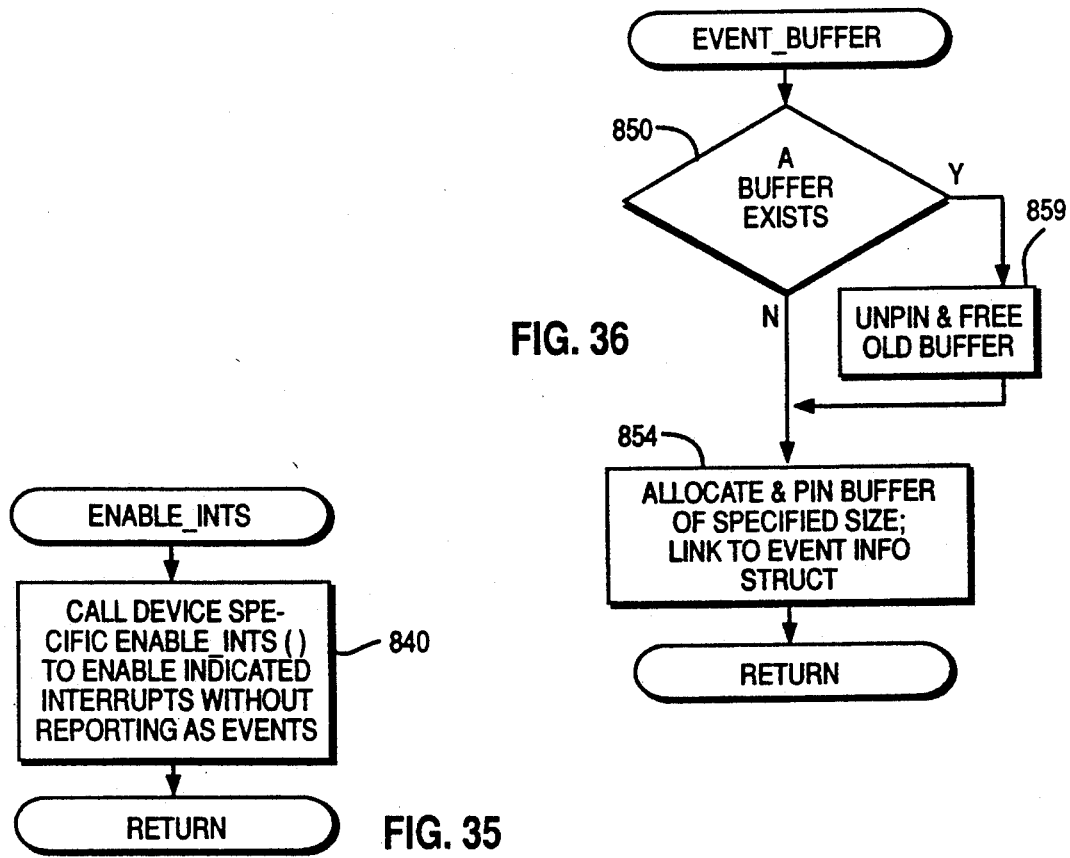
FIG. 36
FIG. 35

DISPLAY ADAPTER EVENT HANDLER WITH RENDERING CONTEXT MANAGER

This is a continuation of application Ser. No. 07/819,616 filed Jan. 9, 1992, which is a continuation of Ser. No. 07/480,182, filed Feb. 13, 1990, both now abandoned.

RELATED PATENT APPLICATIONS

This patent application is related to copending patent application Ser. No. 07/480,186, field Feb. 13, 1990 entitled "Rendering Context Manager for Display Adapters"; patent application Ser. No. 07/480,101, filed Feb. 13, 1990 entitled "First-In/First-Out Buffer Queue Management for Multiple Processes"; patent application Ser. No. 07/480,183, filed Feb. 13, 1990 entitled "Rendering Context Manager for Display Adapters Supporting Multiple Domains"; and patent application Ser. No. 07/480,187, filed Feb. 13, 1990 entitled "Improved Locking Semantics in a Rendering Context Manager".

1. Technical Field

This invention relates to data processing systems and, more specifically, to software management of data processing systems that include display adapters.

2. Background of the Invention

Modern data processing systems include an interrupt generating capability. The interrupt is a signal that is raised upon the occurrence of a preset event (such as power down). The interrupts are commonly used by software to determine the current state of hardware. However, it is often a waste of software to consistently monitor interrupts that may not have direct impact upon the execution of the current process in the data processing device.

Prior art in this area of technology includes "Virtual Graphics" by Voorhies, Kirk and Lathrop, published in *Computer Graphics,* Vol. 22, No. 4, August, 1988. This paper addresses multiple process workstations that include a single task oriented graphics display adapter. This paper addresses the problem of switching display adapter contexts rapidly. This is accomplished by the use of a coprocessor exception based detection of graphic ownership violations (a graphics process attempting to access a device when it does not have access to the device, the efficient swapping of drawing context in hardware, exception based command flow control, the clipping of drawings to window boundaries and the switching of pixel formats and lookup tables for pixels. This reference teaches that additional hardware is a partial solution to the problem of quickly changing display contexts.

The article "Hardware Acceleration for Windows System" by Rhoden and Wilcox, published in *Computer Graphics,* Vol. 23, No. 3, July, 1989, illustrates a hardware implementation to provide multiple windowing capabilities.

*IBM Technical Disclosure Bulletin,* Vol. 30. No. 1, June, 1987, entitled "Virtual Machine Interface/Virtual Resource Manager", discloses a context switching mechanism for a virtual machine. In this reference the complete context for the central processing unit is changed.

*IBM Technical Disclosure Bulletin,* Vol. 28, No. 8, January, 1986, entitled "Screen-Sharing Ring for Enhanced Multiple Application Display", discloses a technique for laying out display windows that are displayed in dedicated rectangular subareas.

*IBM Technical Disclosure Bulletin,* Vol. 25. No. 8, January 1983 entitled "Asynchronous Data Transfer Buffer for NP Systems", discloses a multiprocessing communications system where the processors communicate to each other in order to avoid contention when accessing a commonly shared memory.

*IBM Technical Disclosure Bulletin,* Vol. 28. No. 12, May, 1986, entitled "Hardware Display Windowing System", discloses a hardware windowing system for use with a display that is shared by multiple processors.

*IBM Technical Disclosure Bulletin,* Vol. 27, No. 5, October, 1984, entitled "Multiprocessor System to Improve Context Switching", discloses a processing system that reduces context switching by specifying that only one processor is active at a time.

*IBM Technical Disclosure Bulletin,* Vol. 24. No. 1, November, 1981, entitled "Multi-Tasking Using Co-Equal Multiprocessors Having Memory-Lock Facilities", discloses a locking scheme for a multiprocessing system using a commonly shared memory.

DISCLOSURE OF THE INVENTION

In according with the present invention, a data processing system is provided for executing a process and providing an interrupt signal upon the occurrence of a predetermined event. An interrupt manager is provided that includes the capability for receiving the interrupt signal and providing data indicative of the occurrence of the interrupt signal. Also, the capability for evaluating the data according to a predetermined criteria to determine if an event signal is to be provided to the process is provided by the interrupt manager. Lastly, the capability to provide the event signal only when indicated by the evaluating means is included.

BRIEF DESCRIPTION OF THE DRAWING

The foregoing and other objects, aspects and advantages of the invention will be better understood from the following detailed description of the Best Mode for Carrying Out the Invention with reference to the figures listed below, in which:

FIG. 4 is an illustration of the graphics system call format with parameters;

FIG. 8 is a flow chart of the create rendering context module;

FIG. 23 is a flow chart of the timer handler;

FIG. 24 is a flow chart of the exit handler:

FIG. 25 is a flow chart of the heavy switch controller module:

FIG. 28 is a flow chart of the rendering context switch module:

FIG. 29 is a flow chart of the rendering context dispatch module:

FIG. 34 is a flow chart of the asynchronous event (ASYNC$_{13}$EVENTS) module;

FIG. 35 is a flow chart of the enable interrupts (ENABLE$_{13}$INTR) module:

FIG. 36 is a flow chart of the event buffer (EVENT$_{13}$BUFFER) module;

BEST MODE FOR CARRYING OUT THE INVENTION

Figure 1:
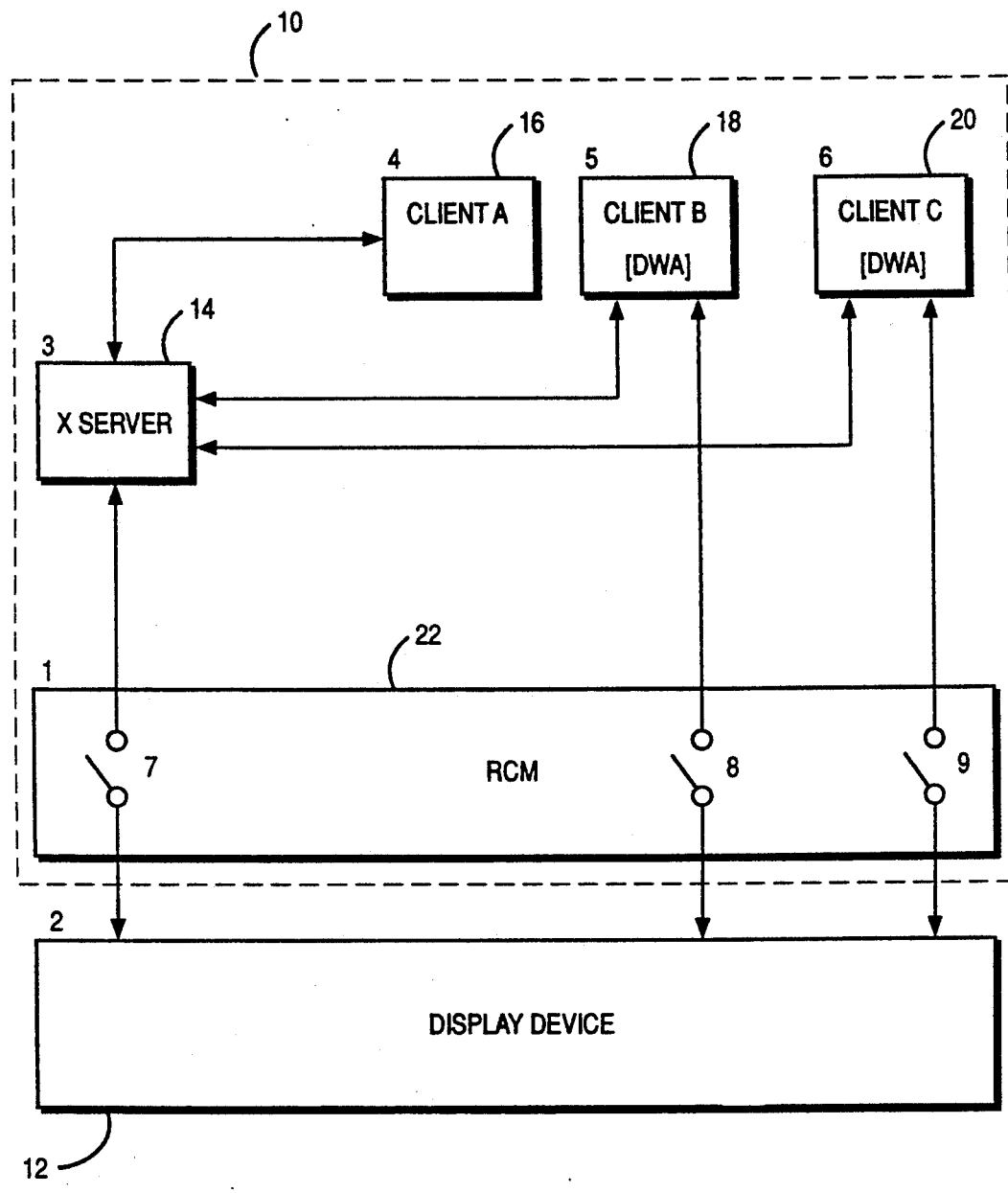
FIG. 1 is a block diagram of a central processing unit connected to a display device.

This invention relates to a data processing mechanism to provide display access to several application processes that are running in a time-shared (simultaneous) environment as is typical of multitasking operating systems. In FIG. 1, these application processes (applications programs that require display output to a user) are illustrated as Client A 16, Client B 18 and Client C 20. These three application programs, 16, 18 and 20, exist in a central processing unit 10 as instructions that are being executed in a multi-tasking environment that appears to the user to provide simultaneous execution of all of the application programs. Additionally an X Server 14 is provided. The X Server program module 14 is provided in a UNIX system as a display resource manager, and specifically for managing the resources of the display for the application programs that require display output. In the prior art, an applications program such as Client A 16 would interface to the display device 12 only through the X Server 14. All application programs requiring access to the display device would, in fact, interface to the display device only through the X Server. In the present invention, applications programs, such as Client B 18 and Client C 20, are provided with the capability of performing direct window access (DWA) to the display device 12. Initially, Client B 18 and Client C 20 must access the X Server 14 in order to have the display device resources, such as a window on the display, allocated to them. However, after the resources have been allocated, the Client B 18 and Client C 20 modules then perform direct window access functions in order to display information to the user. These accesses are performed in a manner that allows the Client B 18 and Client C 20 to exist independently of each other.

FIG. 1 also includes the rendering context manager (RCM) 22. In general terms, the RCM 22 provides a mechanism such that each of the programs (X Server 14, Client B 18 or Client C 20) accessing the display device can do so without having to interface with any of the other programs accessing the display device 12. The display device 12 is a typical display device for a CRT display, which must be treated as a serially reusable device. In other words, the display device expects to see only one applications program s data at a time. Therefore, the RCM 22 permits only a single applications program to access the display device 12 at any given instant, while making it appear to the X Server 14, Client B 18 and Client C 20, that these applications programs are simultaneously providing data to the display device. In other words, both the X Server 14, and the other applications programs, 18 and 20, are allowed to read and write directly to the display device 12 without any concern as to what other device is attempting to access the display device 12. Yet the display device 12, at any one time, can be written to or read from by only one of the X Server, Client B or Client C.

Client A 16 connected to the X Server 14 communicates all of its information to the display device 12 through the X Server 14. This is the typical display adapter interface in the prior art for client-server environments. However, the direct window access capability is required in order to meet the increased performance requirements of certain classes of applications programs.

The rendering context manager 22 provides this interface by (a) ensuring that only one of the processes wishing to access the display device 12 can do so at any given time, and (b) switching the display device rendering contexts required by the applications programs. A rendering context is an environment established on the display device 12 by a process, such as the X Server 14, Client B 18 or Client C 20 that permits the display device to render properly for that process. A rendering context includes, for example, the window clipping information, and the rendering attributes, such as line color and style (e.g., solid or dotted). In other words, the display environment required by the applications program must be provided when that applications program is displaying data to the user. Yet this environment will differ between applications programs. The function of the RCM 22 is to ensure that as it permits each applications program to access the display device, it also places on the display device the proper rendering context, or environment, for that applications program.

In the preferred embodiment that is discussed, a single display device 12 is connected to the RCM 22. However, after examining the accompanying figures it should be apparent to those skilled in the art, that this invention is designed to function with several display devices connected to it.

Figure 2:
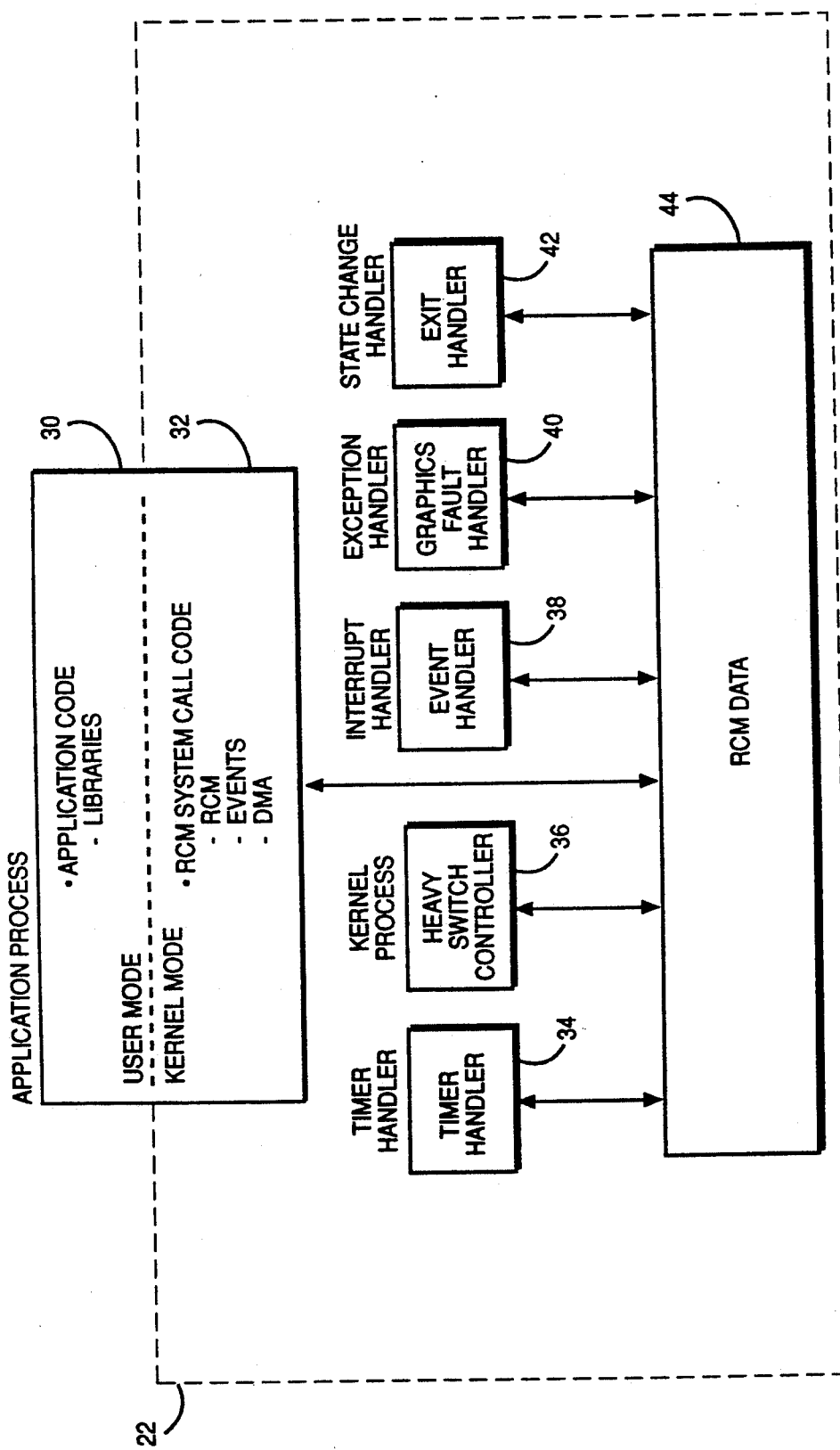
FIG. 2 is a block diagram of the rendering context manager.

FIG. 2 is a detailed illustration of the RCM 22. The RCM 22 provides an interface to the applications program. Part 30 represents the application code. The applications code 30 interfaces directly with the RCM system call functions 32 (see FIG. 3 and FIG. 4).

The applications program will make a system call to the RCM 22. The RCM will in turn allocate modify or, in some manner, access the RCM data 44. Also, the RCM system call functions can communicate with the other components illustrated through the data area.

The RCM timer handler 34 is a function that handles timer interrupts. The RCM causes the operating system to periodically invoke the RCM timer handles 34. The RCM timer handler 34 can use several criteria to determine if it is possible to take the display device away from the process that currently has access to it and to allow another process access to this display device (in other words, initiate rendering a rendering context switch). For example, the fact that the timer handler 34 gets invoked indicates the passing of a specified time period with a first process having access to the display device; if a second process requires access to that device the timer handler will initiate a context switch such that the first process loses its ability to access the device and the second process gains the ability to access the display device.

The RCM heavy switch controller 36 is an operating system kernel process that controls switching that is started by an RCM component that operates on an interrupt level, such as the timer handler 34 or the fault handler 40, but which will require more time or function (e.g., an interrupt handler cannot sleep) to perform than is allowed by the operating system for actions by an interrupt handler. For instance the control switch may be such that additional memory resources are required that, in turn, require virtual address translation tasks to be performed that are relatively time consuming. This heavy switch controller 36 module provides this function without requiring the interrupt handler to perform these additional tasks. For example, the heavy switch controller 36 may initiates DMA transfers that can occur concurrently with the operation of other processes.

The RCM event handler 38 is an interrupt handler that fields all interrupts from a display device. It determines when external events have occurred and depending upon preset conditions, alerts a waiting process (for example, the heavy switch controller or an application process) or simply records information in the RCM data storage 44.

The graphics fault handler 40 is a RCM function that handles exceptions generated by application process actions related to accessing a display device (analogous to page faults). The graphics fault handler 40 is invoked when a process that does not have permission to access the display device attempts to access the display device. The graphics fault handler 40 determines, based on certain criteria, whether the faulting process should be given to the device or not. Examples of such criteria are the state of the timer for the process that currently has access to the device whether the any process has locked the device, or other conditions preventing a change. If the process is to be given access to the display device, the graphics fault handler 40 then initiates a context switch to provide the correct environment on the device for the faulting process and the gives the faulting process the ability to access the device, after removing the ability for the previous process to access the device.

The exit handler 42 is a function that handles certain process state changes. In other words, when a process is exiting or ending (i.e., it will no longer need access to the display device, or even the CPU), the exit handler 42 performs any actions required to leave the data in the RCM data storage 44 in the appropriate state.

Figure 3:
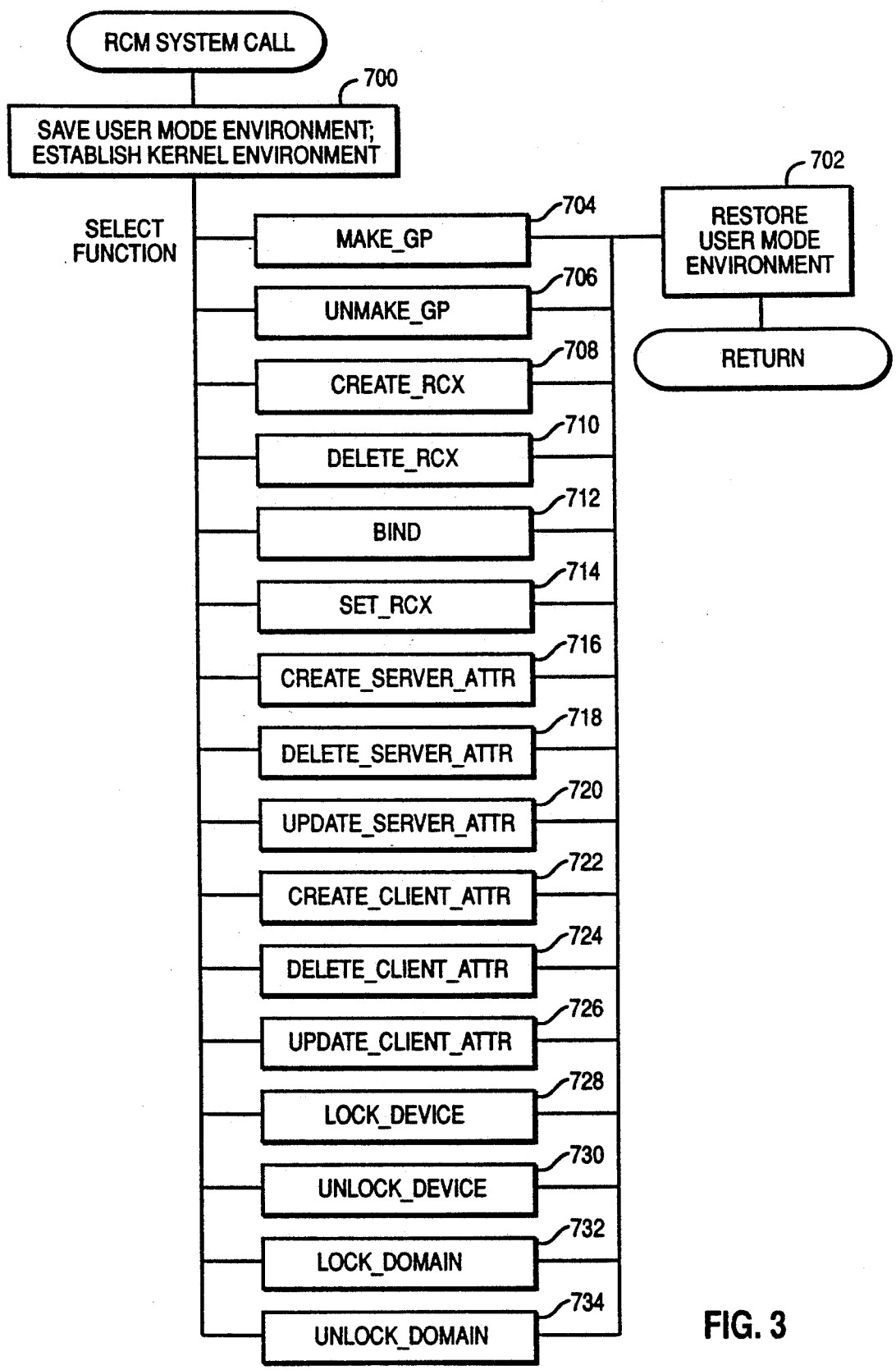
FIG. 3 is a flow chart of the rendering context manager system call function.
Figure 6:
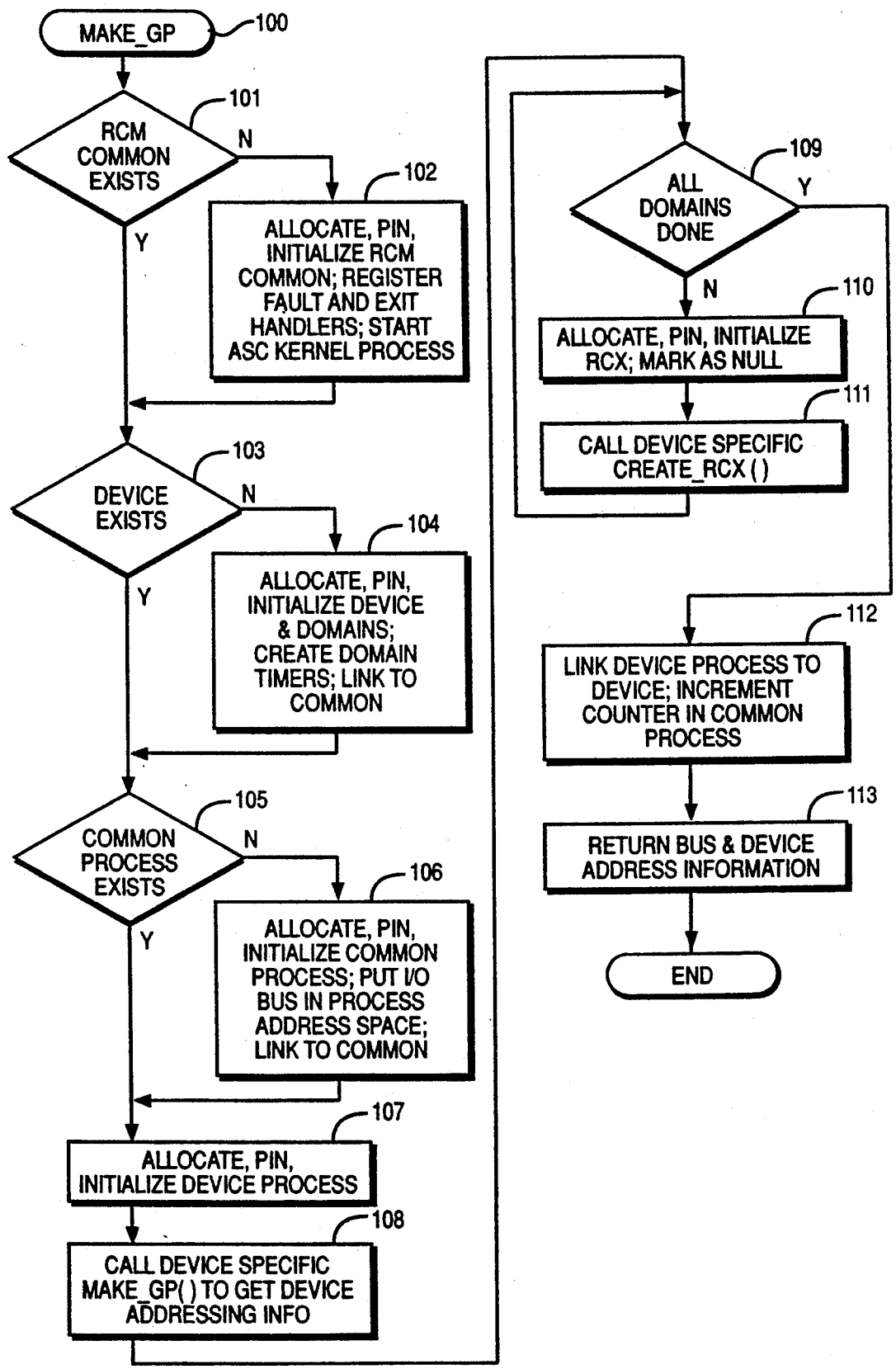
FIG. 6 is a flow chart of the make graphics process (MAKE$_{13}$GP) module.
Figure 7:
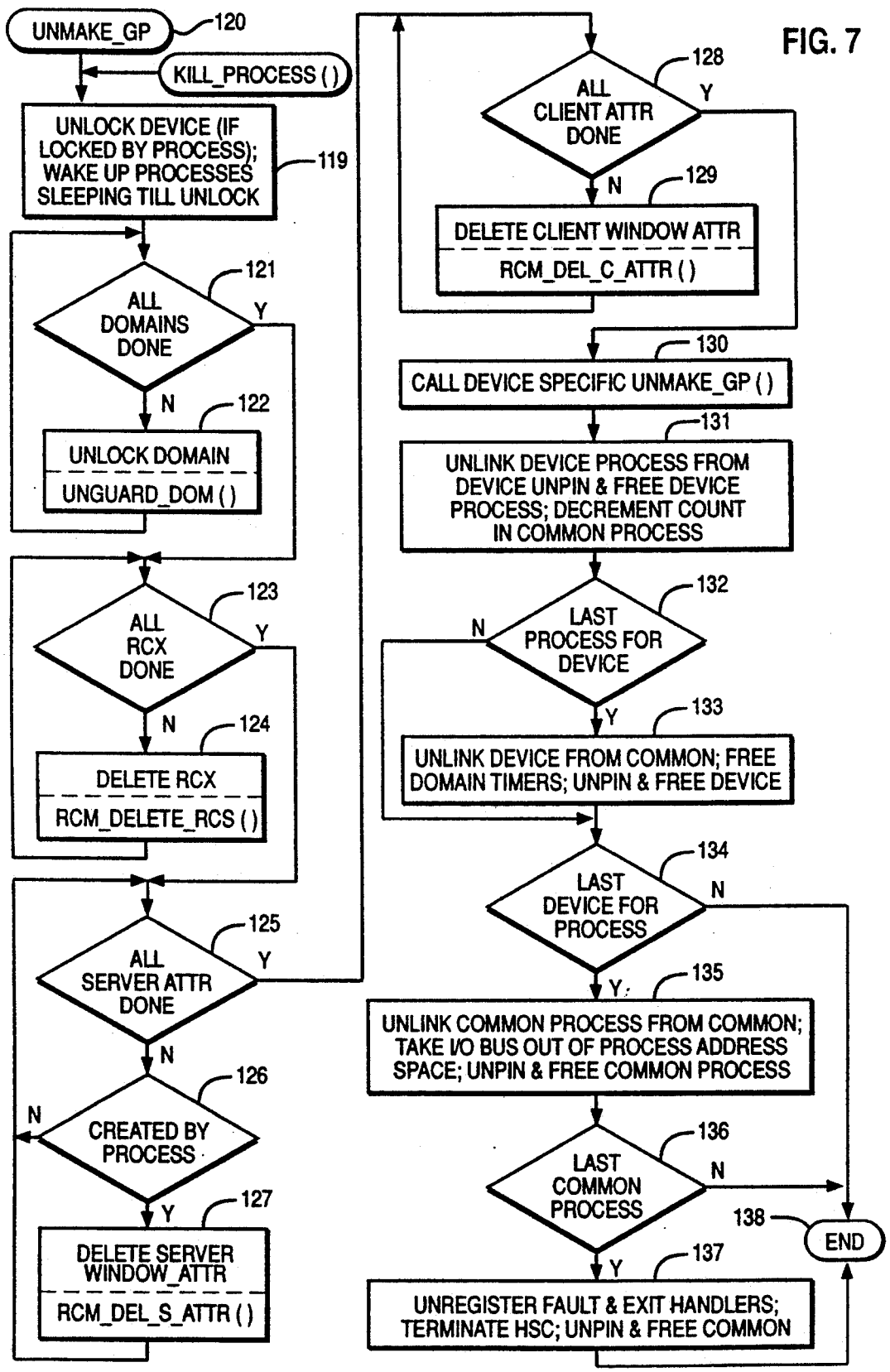
FIG. 7 is a flow chart of the unmake graphics process (UNMAKE$_{13}$GP) module.
Figure 9:
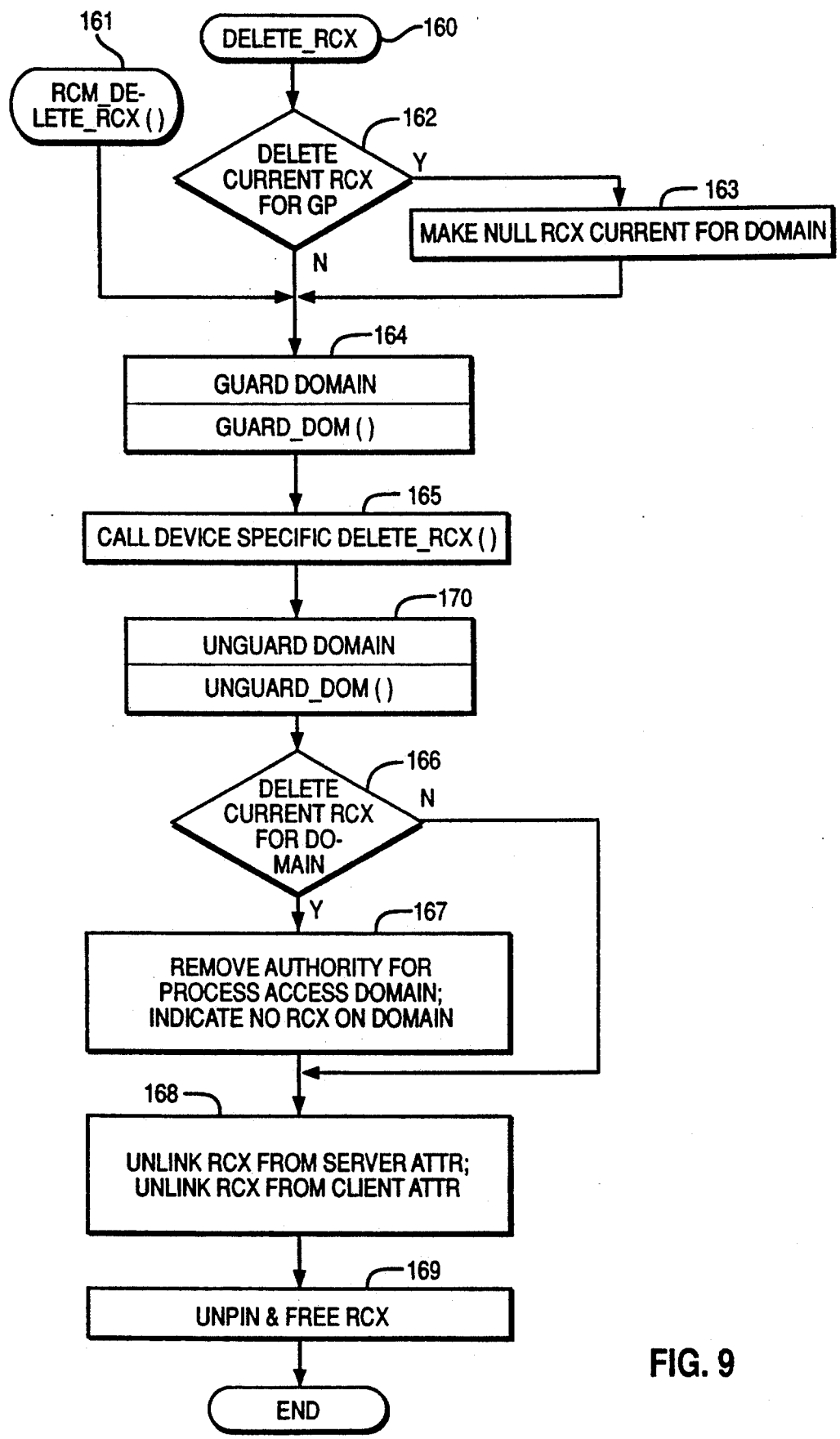
FIG. 9 is a flow chart of the delete rendering context module.
Figure 10:
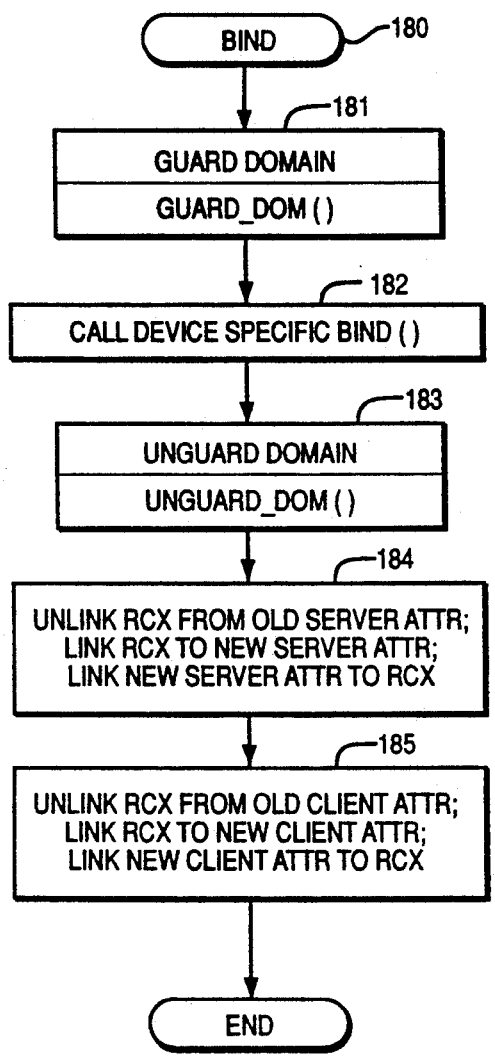
FIG. 10 is a flow chart of the bind module.
Figure 11:
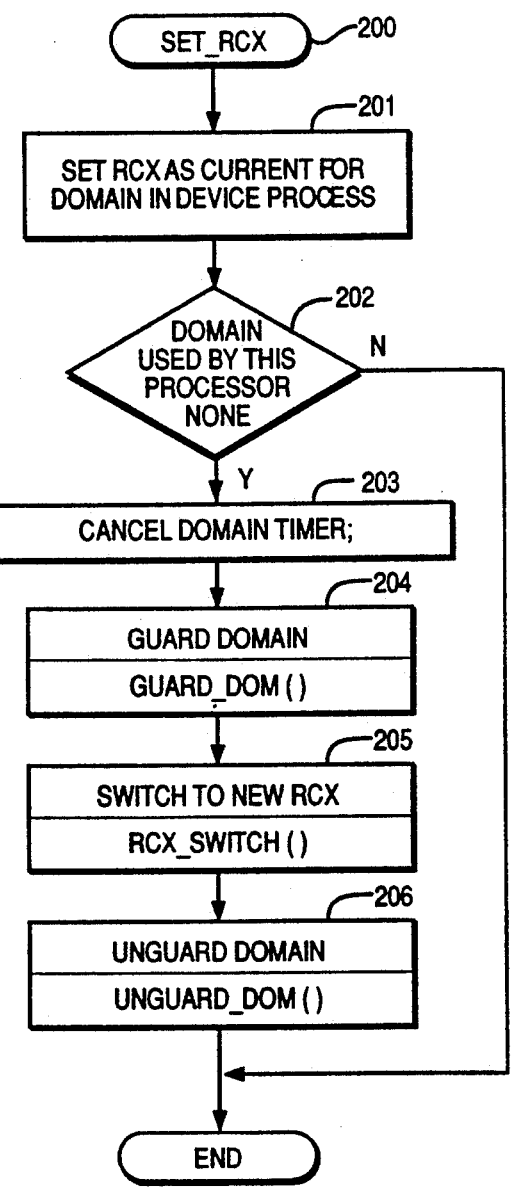
FIG. 11 is a flow chart of the set rendering context module.
Figure 12:
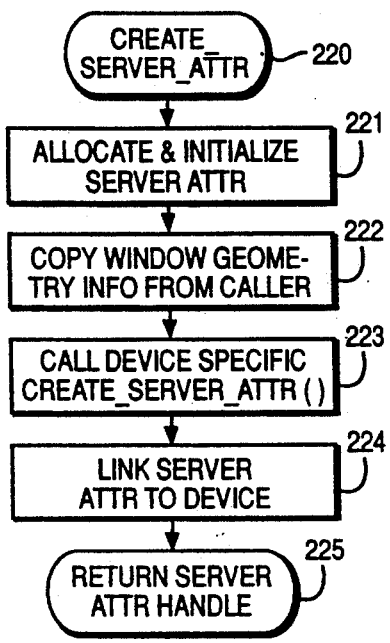
FIG. 12 is a flow chart of the create server attribute (CREATE$_{13}$SERVER$_{13}$ATTR) data structure module.
Figure 13:
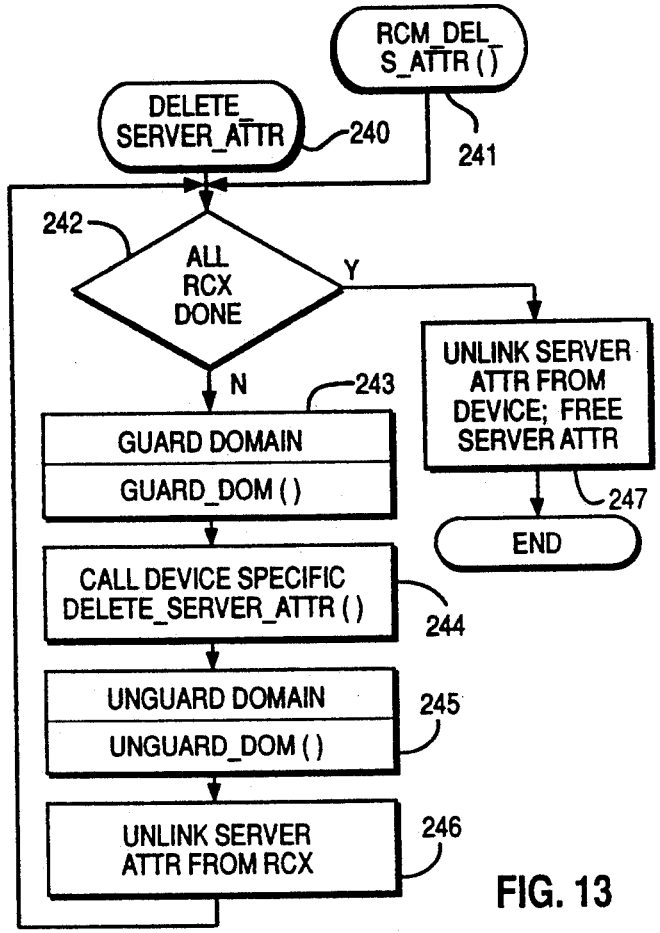
FIG. 13 is a flow chart of the delete server attribute (DELETE$_{13}$SERVER$_{13}$ATTR) data structure module.
Figure 14:
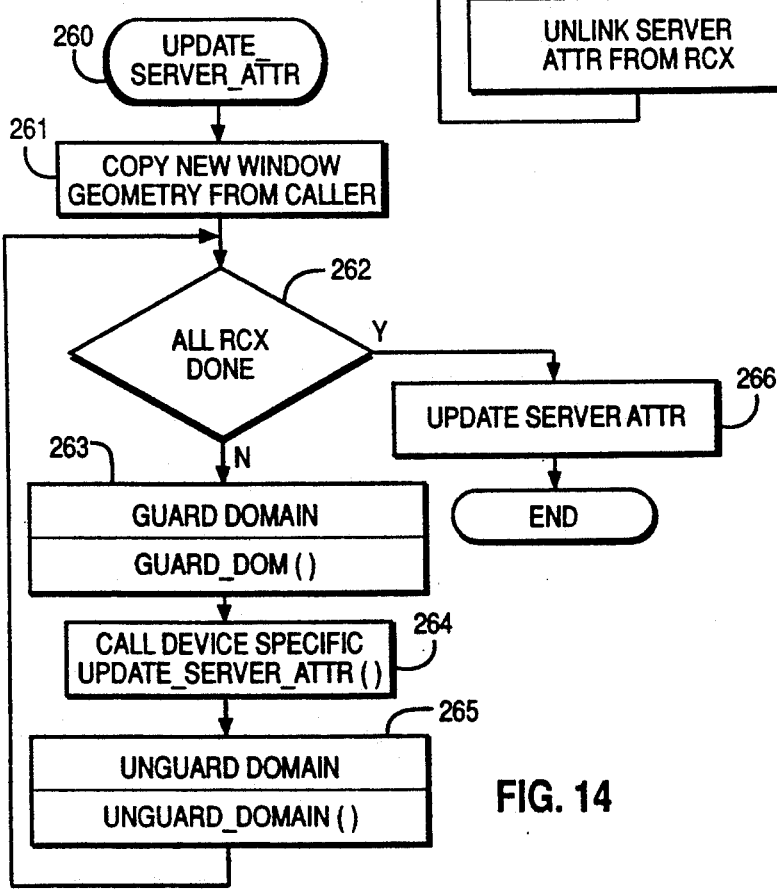
FIG. 14 is a flow chart of the update server attribute (UPDATE$_{13}$SERVER$_{13}$ATTR) data structure module.
Figure 15:
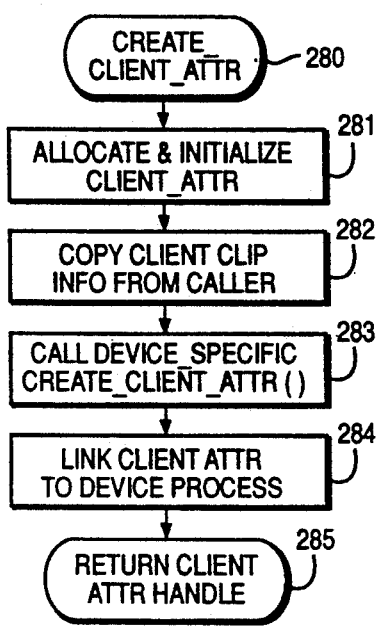
FIG. 15 is a flow chart of the create client attribute (CREATE$_{13}$CLIENT$_{13}$ATTR) data structure module.
Figure 16:
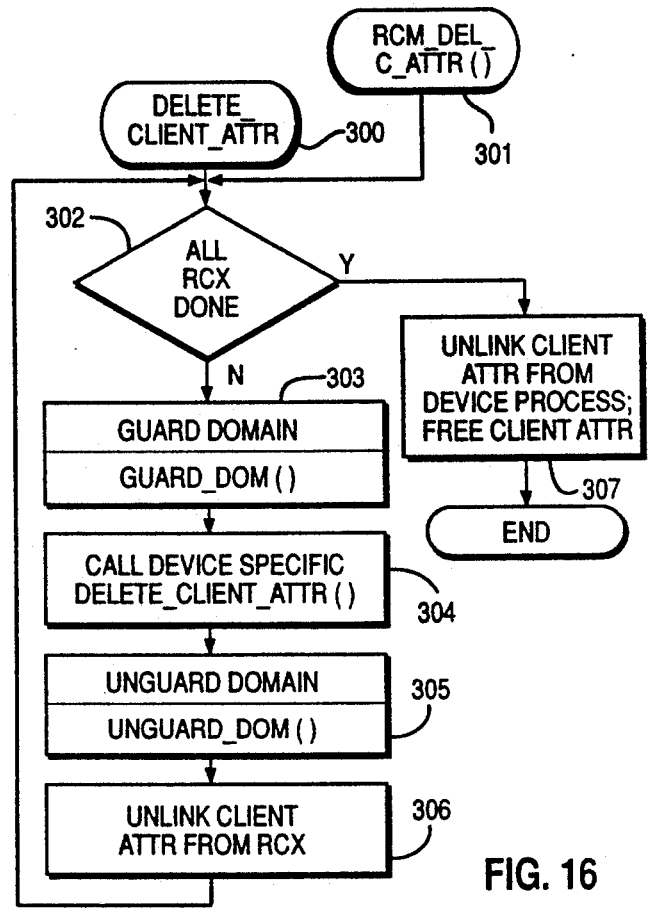
FIG. 16 is a flow chart of the delete client attribute (DELETE$_{13}$CLIENT$_{13}$ATTR) data structure module.
Figure 17:
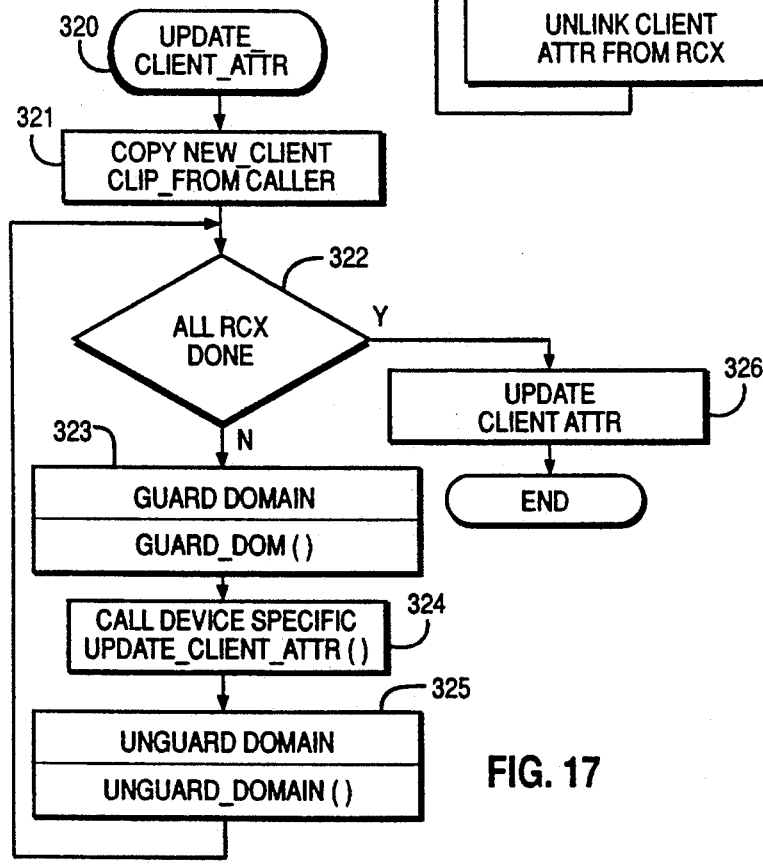
FIG. 17 is a flow chart of the update client attribute (UPDATE$_{13}$CLIENT$_{13}$ATTR) data structure module.
Figure 18:
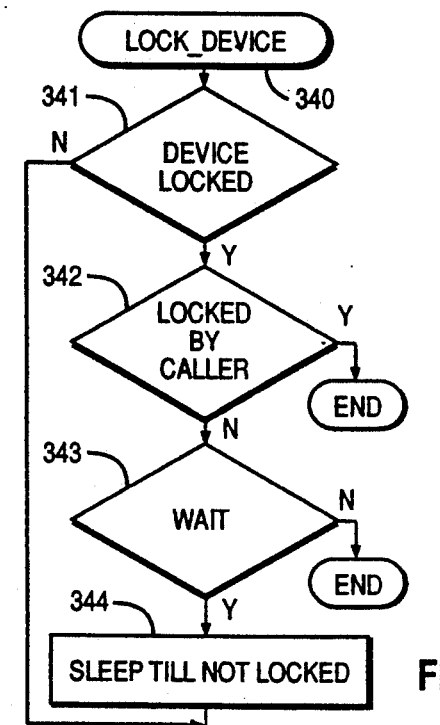
FIG. 18 is a flow chart of the LOCK$_{13}$DEVICE module.
Figure 19:
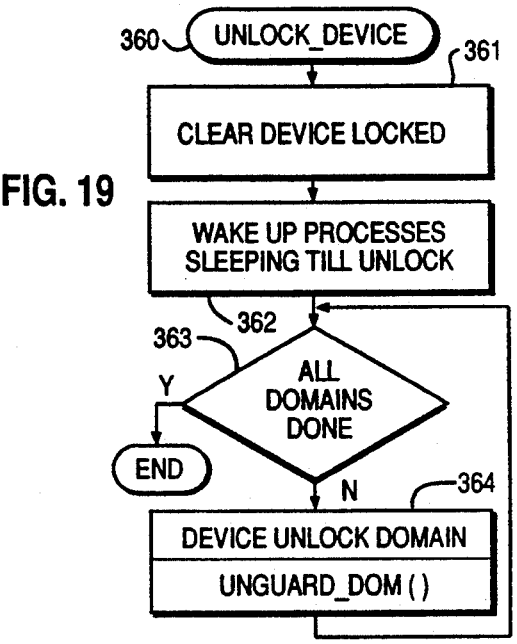
FIG. 19 is a flow chart of the UNLOCK$_{13}$DEVICE module.
Figure 20:
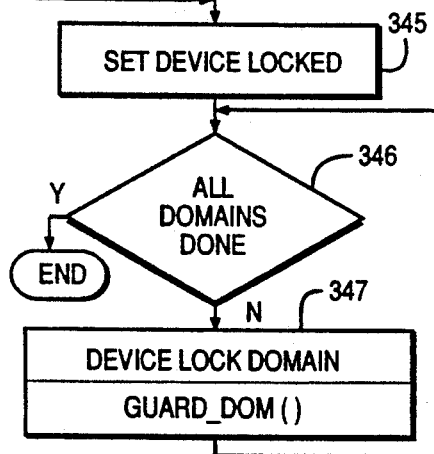
FIG. 20 is a flow chart of the LOCK$_{13}$DOMAIN module.
Figure 21:
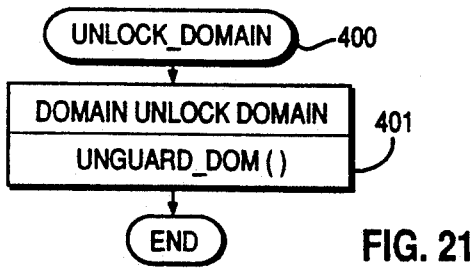
FIG. 21 is a flow chart of the UNLOCK$_{13}$DOMAIN module.

FIG. 3 is a flow chart illustrating the rendering context manager system call 32. In step 700, the rendering context manager saves the user mode environment (such as saving the general purpose registers and the stack) and then establishes the kernel environment (such as providing the a kernel mode stack). The system call will include parameters that define the device to which the system call is directed, the function to be executed, and any parameters necessary for that function. After the execution of these functions, step 702 is performed, which restores the user mode environment. The functions in FIG. 3 include the MAKE$_{13}$GP function 704. MAKE$_{13}$GP function is illustrated in FIG. 6. The UNMAKE$_{13}$GP function is illustrated in FIG. 7. FIG. 8 is the create rendering context (CREATE$_{13}$RCX) 150. FIG. 9 is the delete rendering context (DELETE$_{13}$RCX) 710. FIG. 10 is the bind module 712. FIG. 11 is the SET$_{13}$RCX (rendering context) module 714. FIG. 12 is the CREATE$_{13}$SERVER$_{13}$ATTR (attribute) module 716. FIG. 13 is the DELETE$_{13}$SERVER$_{13}$ATTR module 718. FIG. 14 is the UPDATE$_{13}$SERVER$_{13}$ATTR module 720. FIG. 15 is the CREATE$_{13}$CLIENT$_{13}$ATTR module 722. FIG. 16 is the DELETE$_{13}$CLIENT$_{13}$ATTR module 724. FIG. 17 is the UPDATE$_{13}$CLIENT$_{13}$ATTR module 726. FIG. 18 is the LOCK$_{13}$DEVICE module 728. FIG. 19 is the UNLOCK$_{13}$DEVICE module 730. FIGS. 20 and 21 are the LOCK$_{13}$DOMAIN module 732 and the UNLOCK$_{13}$DOMAIN module 734, respectively. Each of these functions will be discussed in more detail.

FIG. 4 an illustration of a systems call interface specifically for the graphics system. It should be understood by those skilled in the art that the system call is a protocol that is provided by the operating system that is in use. In the present invention, the graphic system call is implemented in the AIX operating system.

Figure 5:
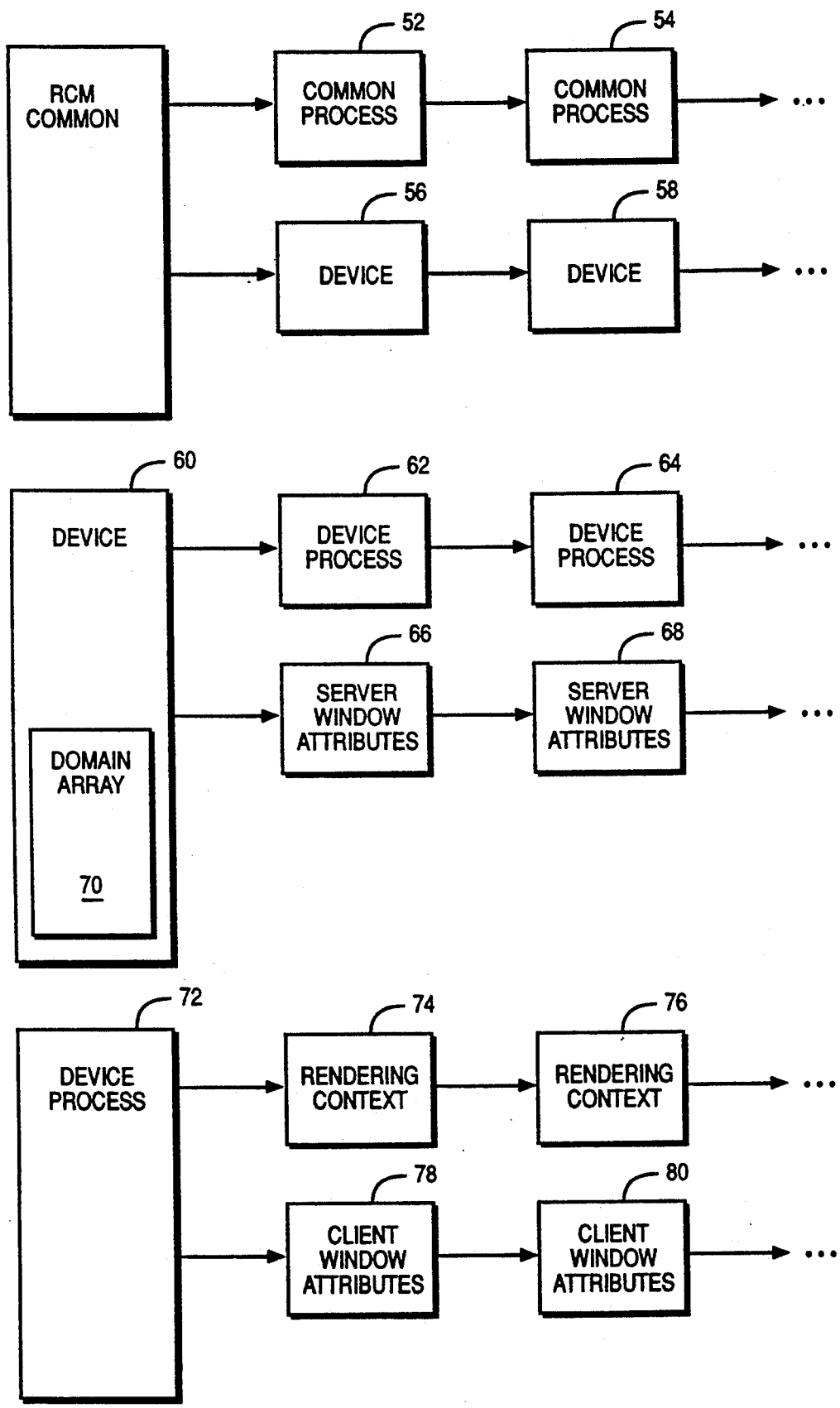
FIG. 5 is a block diagram illustrating the rendering context manager data structures.

FIG. 5 an illustration of the RCM data storage 44. Block 50 is the central point for the RCM data structures stored in the data block 44. The RCM common 50 contains the head of a linked list of common processes (such as 52 or 54) and the head of a linked list of device blocks (such as 56 or 58). The operating system provides means for the handlers to gain access to the RCM data structures.

The common process block, 52 and 54, contain information that is global to all devices to which a process requires access (i.e., the same data applies to all devices). It contains a link to the next common process (such as common process 54), the summation of authorization information for devices to indicate those devices that the process is authorized to access, and a count of the device process structures for the common process structure. It should be understood that parts of the common process data structures 52 and 54 are dependent upon the specific operating system in use.

The device data structure is more fully illustrated in block 60. It is a description of a display device managed by the RCM 22. Each device structure block contains a link to the next device structure block, a head of a linked list of device process data structures (such as device process 62 and device process 64), a head of linked list of server window attribute structures (such as blocks 66 and 68), a link to the device process structure representing the application process that has the device locked, the head of a list of graphics processes waiting to lock the device, a link to the device private storage, an array of domain structures, and flags to indicate various conditions. Note that the device data structure 60 includes a domain array 70. It should be understood that the RCM 22 can authorize access to independent domains of display devices independently. A device domain is an environment within the device to which a graphics process is providing data.

Each entry in the domain array 70 contains a link to the device process structure that represents the application process that has the domain locked, the head of a list of device processes waiting to guard or lock the domain, a link back to the device for use by the fault handler 40, domain authorization information (i.e., information indicating what has to be done to allow a process access to the domain), a link to the current rendering context for the domain (i.e., the rendering context that is currently loaded on the domain), a link to the device process structure representing the process that owns the current rendering context, the head of the fault list, which is a linked list of rendering contexts for graphics processes that have faulted trying to access the domain, timer information and various flags to indicate other pertinent conditions.

The device process structure 62 contains information that a graphics process would require for accessing a specific display device. The device process structure contains, for example, a link to the next device process, a link to the common process structure (such as common process 52), the priority of the graphics process on the display device, a head of a linked list of rendering context data structures created by the graphics process(such as rendering context structures 74 and 76, the head of a linked list of client window attribute structures (such as client window attribute blocks 78 and 80), a link to the device private storage flags to indicate various conditions, and an array of links to the current rendering context for each domain of the device for the graphics process.

The rendering context block (such as block 74) contains or contains links to all of the information defining a rendering context. For example, the rendering context block will contain a link to the next rendering context, a link to the next rendering context in the fault list, a link to the device process structure for the graphics process that created the rendering context, the current priority of the rendering context, the link to the domain that the rendering context was created for, a link to the server window attribute data structure bound to the rendering context, a link to the client window attribute data structure bound to the rendering context, a link to the device private storage, flags to indicate various conditions, a link to the next rendering context in the list rendering context bound to the server window attribute, and a link to the next rendering context in the list rendering context bound to the client window attribute.

The server window attribute structure (such as blocks 66 and 68) contain descriptions of the geometry (e.g., shape and location) of window that must be assigned by a server. Each server window attribute data structure contains a link to the next server window attribute data structure, a head of a linked list of rendering context data structures bound to this server window attribute, a link to the device process data structure for the graphics process that created this server window attribute data structure, a description of the window geometry and color map, a link to the device private storage and flags indicating various conditions.

The client window attribute data structure (such as blocks 78 and 80) contain a description of resources for a window and may be assigned by a client. These data structures specifically contain a link to the next client window attribute data struc- ture, a head of a linked list of rendering context structures bound to this client window attribute data structure, a description of the client clip geometry, a description of the pixel interpretation for the window (e.g., the pixel is used as a color directly, or as an index into a lookup table), a link to the device private storage and flags to indicate various conditions.

The data structures illustrated in FIG. 5 are advantageous in that they save data storage space by providing single storage for data that is common to multiple processes or multiple devices while separating data into separate structures when required. This results in a savings of search time when data is retrieved, and minimizes the amount of data necessary to implement the RCM function.

FIGS. 6 through 31 describe in detail the operation of the rendering context manager in flow chart form. For the sake of simplicity, error conditions have not been included. A system call that is used to control the RCM 22 can request one of several functions. FIGS. 6 through 21 illustrate these different functions. In FIG. 6, the MAKE$_{13}$GP 100 allows a process to become a graphics process. This involves authorizing access to a display adapter and returning the display device addresses to be used by the process to access the display device. This function also initializes the RCM 22 the very first time it is called. MAKE$_{13}$GP 100 calls a device specific MAKE$_{13}$GP() 108 which can perform any device specific functions required for the creation of a graphics process. The device specific MAKE$_{13}$GP() 108 is part of the device driver software required to support a display device in the system; this device driver software includes other functions to support the device specific aspects of rendering control management. One of the parameters the calling process must pass to MAKE$_{13}$GP 100 and all other RCM 22 system call functions is a device identifier: this identifier allows the RCM to understand for which of multiple devices the calling process wishes to become a graphics process. This device identifier is a parameter for all RCM system call functions. Another parameter for MAKE$_{13}$GP 100 is information from the calling process that MAKE$_{13}$GP passes on to MAKE$_{13}$GP() 108. MAKE$_{13}$GP 100 creates a null rendering context for each domain for the display device; the null rendering context allows the process to access the device but does not allow any actions by the process to become visible; it is used mainly in process intialization and process exit situations. MAKE$_{13}$GP 100 then calls the device specific RCX() 111 which performs any device specific functions required in the creation of the new context.

The MAKE$_{13}$GP module begins with step 101 where the rendering context manager determines if a common data structure already exists for the process that is being called. If not, the process proceeds to step 102 to build a common data structure by allocating storage, pinning the memory (requiring that the structure remain in real storage and not be "paged" out to the backing storage device, which is typically a disk), and initializing the data structure, registers the fault and exit handlers with the operating system kernel so that they get called by the kernel under the appropriate circumstances. Also, the heavy switch controller is started as a kernel process. In step 103, the RCM determines if the device data structure exists. If not, again in step 104 the memory is allocated, pinned and initialized for both the device and domain data structures. Also, the RCM sets up a timer for each domain and registers the timer handler with the kernel. Finally, the RCM links the device structure to the common data structure. In step 105, the process determines if a common process data structure exists for the calling process. If not, in step 106 the common process structure is created, pinned, and initialized. In step 107, the device process data structure is formed. In step 108, the call device specific MAKE$_{13}$GP module is called to provide device addressing information. The device specific MAKE$_{13}$GP module is part of the device driver for the specific device. In step 109, the process determines if a null rendering context exists for all device domains. If not, the RCM proceeds through a loop including steps 110 and 111 to to create and initialize the null rendering context structures, calling the device specific CREATE$_{13}$RCX() to perform any device specific initialization required. When all the null rendering contexts have been set up, the RCM proceeds to step 112 to link the device process structures to the device structures and to increment the counter in the common process structures. In step 113, the device address information is returned.

The UNMAKE$_{13}$GP routine in FIG. 7 is the opposite of the MAKE$_{13}$GP routine in FIG. 6. Essentially, the object of the UNMAKE$_{13}$GP routine is to undo the data structures that allow the RCM to treat a process as a graphics process. In step 119, if the device is locked by the calling process, it is then unlocked. This includes waking up any other processes that have been waiting for the device to become unlocked. In steps 121 and 122, the RCM enters a loop to make sure any domain locked by the calling process gets unlocked. In steps 123 and 124, the RCM enters another loop to ensure that all rendering contexts owned by the process have been deleted (see FIG. 9). In step 125, 126, and 127, the RCM ensures that all the server attributes created by the process have been deleted (see FIG. 13). After all of the server attribute data structures have been deleted, the RCM proceeds to steps 128 and 129, which is a loop to ensure that all the client attribute structures created by the calling process have been deleted. In step 130, the device specific UNMAKE$_{13}$GP() routine is called; this is a device driver routine specific to the device. It deletes any device specific data structures created for the process by the device specific functions such as MAKE$_{13}$GP(). In step 131, the device process structure is unlinked from the device and the memory previously allocated is freed. Then, the count in the common process is decremented. In step 132, it is determined if this was the last process using the device. If so, that means the RCM no longer has to manage the device; then the device structure is unlinked from the common data structure, the domain timers are freed and the memory for the device structure is freed. In step 134, it is determined if this is the last device used by the calling process. If so, then the process no longer needs to be a graphics process on any display device, and the RCM unlinks the common process structure from the common data structure, takes the I/O bus out of the process address space, and frees the memory used for the common process structure. In step 136, it is determined if the last common process structure is deleted. If so, the RCM can quiesce itself, and in step 137, the fault handlers are unregistered, the exit handler is unregistered, the heavy switch controller is terminated, all remaining memory used by the RCM is freed (e.g., the common structure).

In FIG. 8, the creation of a rendering context is performed. The device and domain parameters are used in creating this context structure, and the rendering context structure created is specific to a device and a domain on that device. In step 151, the memory is allocated, the memory is pinned (kept in real storage) and the context structure is initialized. In step 122, the device specific context creation module (part of the device driver) is called; passed to the device specific CREATE$_{13}$RCX(), is data passed in the system call; this allows the calling process to pass information to the device specific CREATE$_{13}$RCX() that can be used in customizing the device specific data associated with the rendering context structure. In step 153, the context structure is linked to the device process data structure. In step 154, the RCM returns a handle with which the calling process can identify this context in subsequent RCM system calls (e.g., BIND or SET$_{13}$RCX)

In FIG. 9, the deletion of the context is performed. In step 162, it is determined whether the context to deleted is the current context for the calling process for the domain of the context. If so, then, in step 163, the null context is made current for that domain; this is a safeguard against future attempts by the calling process to access the domain. In step 164, the guard domain routine is called; this internal function ensures that no context switching can take place on the domain until it is unguarded; this is necessary because it is possible that the nature of the display device will require certain device specific functions to perform a context switch; guarding the domain ensures that the device specific function gets no interference (e.g., attempts to switch domain context) from the handler components of RCM. In step 165, the device specific delete routine (part of the device driver) is called to perform any device specific functions and to delete the device specific data structure associated with the rendering context structure. Then the domain is unguarded. In step 166, it is determined whether the current context for the domain is being deleted. If so, in step 167, the authority for the process to access the domain is removed and an indication is provided that there is no context for this domain, this makes it possible to switch contexts more simply the next time it is necessary, because no old context need be saved. In step 168, the context structure is unlinked from the server attribute and the client attribute data structures. In step 169, the rendering context memory is freed.

FIG. 10 illustrates the bind module, which is responsible for associating a rendering context structure, a server window attribute structure, and a client window attribute structure; this triplet defines the environment necessary for the display device domain to allow the called process to render correctly. The calling process provide handles to identify the three structures. In step 181, the domain is guarded while, in step 182, the device specific bind module is called. The device specific bind module is part of the device driver for the specific device. In step 183, the domain is unguarded. In step 184, the rendering context structure is unlinked from the old server attribute structure and linked to the new server attribute structure. The new server attribute structure is then linked to the rendering context structure. In step 185, the rendering context is unlinked from the old client attribute structure and linked to the new client attribute structure while the new client attribute structure is also linked to the rendered context structure. All these linkages are necessary to keep track of the associations between the various structures the linkages minimize the search time for rendering contexts and the attribute structures bound with them. These linkages permit many rendering contexts to be bound to the same attribute structures if that is convenient for the application. For example, when a resource server creates a server window attribute, it generally binds a rendering context to it so that it can, for example, clear the background of the window to some user defined color or pattern or both. But later, a direct window access client may use that same window (defined by the same server window attribute) by binding its own, different, rendering context structure to it, so that it can draw lines, shaded surfaces, etc.

FIG. 11 is a flow chart for the set rendering context module. This allows the process to specify the current triplet (rendering context, server window attribute, and client window attribute) for a domain. In step 201, the RCM sets the rendering context as current for that domain in that device process structure. In step 202, we determine whether the domain is being used by the present process or is not used by any process. If it is being used by this process or no process, then, in step 203, the RCM cancels the domain timer, in step 204, guards the domain, in step 205, then switches to the new rendering context, and finally in step 206, unguards the domain.

In FIG. 12, a flow chart for the CREATE$_{13}$SERVER$_{13}$ATTR module is illustrated. In step 221, the data structure is allocated and the server attribute data structure is initialized. In step 222, the window geometry (i.e., a description of the location and shape of the window) is copied from the caller. This geometry information is information that must be passed with the call. In step 223, the device specific CREATE$_{13}$SERVER$_{1-3}$ATTR module is called, which performs any device specific actions required to create the server window attribute structure. This is a device driver module that is specific for the device in use. In step 224, the server attribute structure is linked to the device structure. In step 225, a handle to the server window attribute is returned.

FIG. 13 is a flow chart for the DELETE$_{13}$SERVER$_{13}$ATTR module. The DELETE$_{13}$SERVER$_{1-3}$ATTR module merely undoes what the CREATE$_{13-}$SERVER$_{13}$ATTR module does. In step 242, the RCM enters a loop to ensure that all rendering contexts to which the server window attribute structure is bound get updated to reflect the deletion of the server window attribute (which means the rendering context no longer can allow actions by the process owning the context to be visible); in step 242, the RCM determines if all the rendered contexts bound to the server window attribute structure have been updated. If not, in step 243, the domain is guarded, in step 244, the device specific DELETE$_{13}$SERVER$_{13}$ATTR module is called. This is, again, part of the device driver; the module performs any device specific actions necessary to delete the server attribute from the device, which may include some context switching to allow proper access to the device to change windowing information and deletes any data structures created to the support the server window attribute. In step 245, the domain is unguarded and, in step 246, the server attribute structures is unlinked from the rendering context structure. Once this loop has been exited, the RCM proceeds to step 247 to unlink the server attribute structure from the device structure and to free the server attribute structure.

FIG. 14 is a flow chart illustrating the UPDATE$_{13}$SERVER$_{13}$ATTR module. A process calls this RCM function to change the location of a window, the shape of a window, or both. In step 261, the new window geometry is received from the caller via a parameter on the system call. In step 262, the RCM enters a loop consisting of steps 263. 264 and 265 to ensure that the server window attributes are updated for all of the rendering contexts bound to the server window attribute. In step 263, the domain is guarded and, in step 264, the device driver device specific UPDATE$_{13}$SERVER$_{1-3}$ATTR module is called to update the device specific data structure, passing both the old and new window geometry descriptions; then the domain is unguarded. When all of the rendering contexts have been updated, the RCM proceeds to step 266 to update the server attribute structure.

FIG. 15 is similar to FIG. 12, except that FIG. 15 addresses the client attribute data structure. In step 281, the RCM allocates memory and initializes the client attribute data structure. In step 282, the RCM copies any client clip information and pixel interpretation from the caller. The client clip information is used to provide an additional clip of rendering commands sent to the device by the process (in addition to the window clipping described by the server window attribute). In step 223, the device specific CREATE$_{13}$CLIENT$_{13}$ATTR module is called, which performs any device specific actions required to create the client window attribute structure. This is a device driver module that is specific for the device in use. In step 284, the client attribute structure is linked to the device process structure and then, in step 285, the RCM returns a client attribute handle.

FIG. 16 is analogous to FIG. 13, except that in FIG. 16, the flow chart addresses the DELETE$_{13}$CLIENT$_{13}$ATTR module. In step 302, a determination is performed as to whether all the rendering contexts bound to the client window attribute have been processed. If not, the RCM enters a loop consisting of steps 303, 304. 305 and 306. In step 303, the domain is guarded. In step 304, the device specific DELETE CLIENT ATTR module is called. This is a device driver that is specific for the display device being addressed; the module performs any device specific actions necessary to delete the client window attribute from the device, which may include some context switching to allow proper access to the device to change clipping information, and deletes any data structures created to the support the client window attribute. In step 305, the domain is unguarded. In step 306, the client attribute data structure is unlinked from the rendering context structure. After 306, the RCM returns to step 302. This loop is continued until all the rendering contexts have been processed. Afterwards, the RCM proceeds to step 307 to unlink the client attribute structure from the device process structure and to free the client attribute data structure.

FIG. 17 is analogous to FIG. 14. In FIG. 17, the UPDATE$_{13}$CLIENT$_{13}$ATTR module. A process calls this function to update its client clip or pixel interpretation requirements. In step 321, the RCM copies the new client clip information from the caller. Then the RCM enters a loop consisting of steps 322, 323, 324 and 325 to ensure that the client window attributes are updated for all of the rendering contexts bound to the client window attributes. In step 322, the RCM determines if all of the rendered contexts have been processed. If not, in step 323, the domain is guarded. In step 324, the device specific UPDATE$_{13}$CLIENT$_{13}$ATTR routine is called to update the device specific data structure, passing both the old and new clent clip, etc. descriptions. This is a device specific driver module. In step 325, the domain is unguarded. At the completion of the rendering context processing, the RCM proceeds to step 326 to update the client attribute data structure.

FIG. 18 is a flow chart for the LOCK$_{13}$DEVICE module. The purpose of the LOCK$_{13}$DEVICE module is to ensure that a resource server process can access a device without interruption. This is necessary during major events such as repositioning windows. In step 341 the RCM determines if the device is locked. If not, the RCM proceeds to step 345. If so, the RCM proceeds to step 342 to determine if the device has been locked by the caller. If so, the RCM exits. If not it proceeds to step 343 to determine if the process wants to wait until the device is unlocked and then lock the device. If not, the RCM exits. If the process wants to wait, then the RCM proceeds to step 344 to go to sleep (wait) until the device is unlocked by the process that has the device locked at the current time. When the process gets waked up (see FIG. 19), the RCM proceeds to step 345. In step 345, the device is locked for the calling process. Then the RCM enters a loop consisting of steps 346 and 347 where all the device domains are locked. This is performed in step 347 by executing the guard domain function with a parameter that indicates the domain should be locked instead of guarded. When all the domains have been locked, as per step 346 the RCM exits.

FIG. 19 illustrates a flow chart for the UNLOCK$_{13}$DEVICE module, which effectively undoes what the LOCK$_{13}$DEVICE module did in FIG. 18. In step 361, the device lock flag is cleared. In step 362, processes that have been sleeping (waiting) until the device was unlocked are now awakened (activated). The RCM then enters a loop consisting of steps 363 and 364 to unguard all the domains on the device. When this is accomplished, the RCM exits.

FIG. 20 illustrates a flow chart for the LOCK DOMAIN module. In step 321, the RCM determines if the domain has been locked. If not, the RCM proceeds to step 385. If so, the RCM proceeds to step 382 to determine if the domain is already locked by the caller. If so, there is no reason for the RCM to continue so it exits. If not, the RCM proceeds to step 383 to determine if the calling process wants to wait until domain is unlocked. If not, the RCM exits. If so, the RCM proceeds to step 384 to signal the process that has locked the domain; this is an indication to that process that another process desires to lock the domain, and that it should unlock the domain as quickly as possible. In step 385, the guard domain module is called. This will put the process in a wait state until the process that had previously locked the domain has unlocked the domain. The present RCM then locks the domain for the calling process and exits.

FIG. 21 is the UNLOCK$_{13}$DOMAIN procedure in flow chart form. It basically consists of single step 401 which calls the UNLOCK$_{13}$DOMAIN module to unlock the domain.

Figure 22:
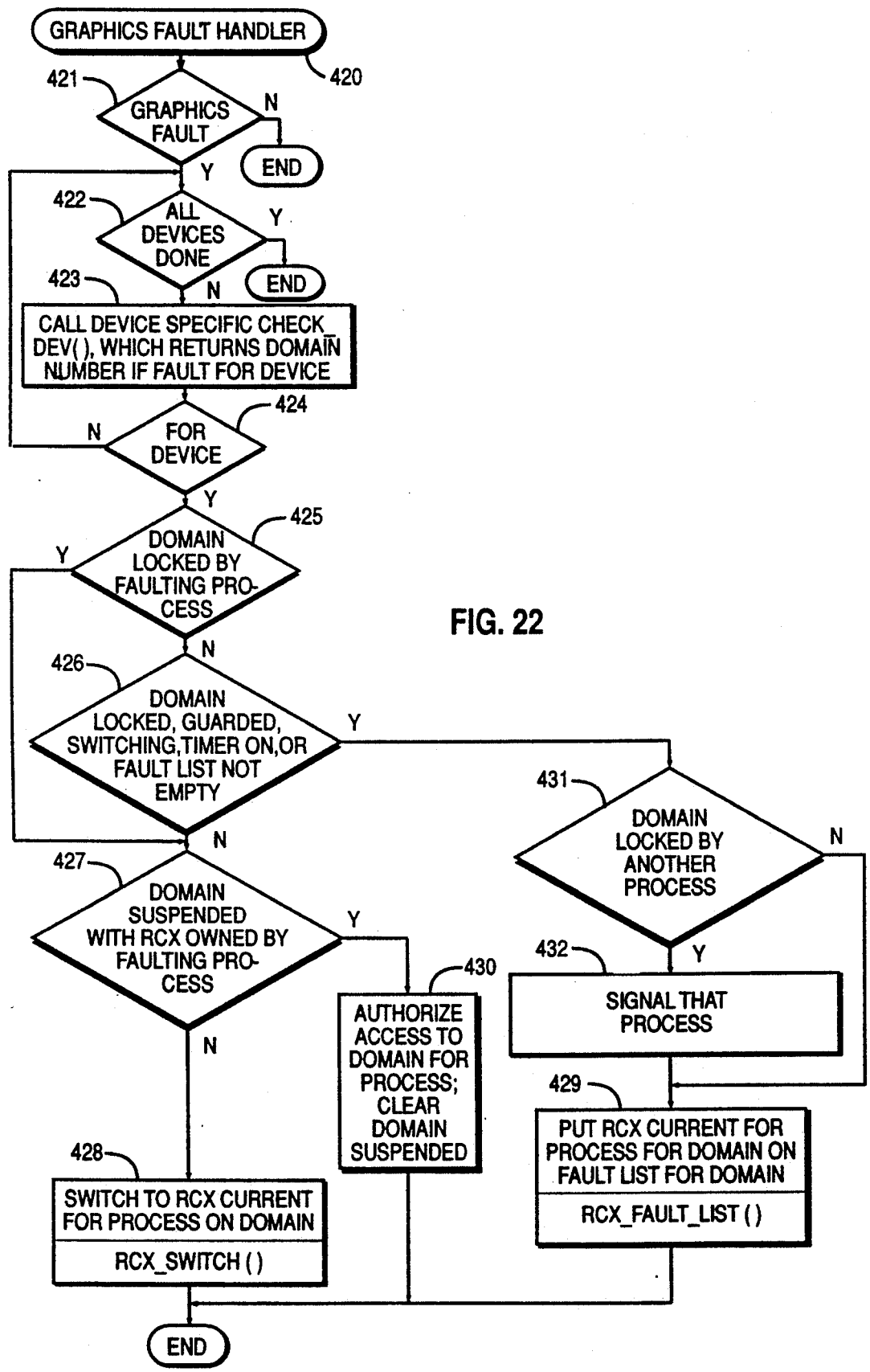
FIG. 22 is a flow chart of the graphics fault handler.

FIG. 22 is a flow chart of the graphics fault handler. A graphics fault occurs when a graphics process attempts to address a device or domain that it is not authorized to address. Such an event would occur when a graphics process is attempting to access the graphics device when it has been previously switched out. This graphics fault will generate an interrupt. A first level interrupt handler will initially handle the interrupt and switch to a second level of interrupt handlers. This graphics fault handler is one of the second interrupt handlers. In step 421, the RCM determines if the faulting process is a graphics process and if the fault is an I/O fault. If not, the RCM exits. If so, the RCM proceeds to step 422. Then the RCM goes into a loop consisting of steps 422, 423 and 424. This loop determines which device, if any, the fault was directed to. If it was directed at none of the devices, the RCM then exits out of step 422. In step 423, for each device a device specific check device routine is called. When the fault has occurred an address is passed to the graphics fault handler. The device specific check device module determines if that address is within the address space for that device. If so, a domain number is returned. Then in step 424, a decision is made whether to exit the loop. In step 425, it is determined whether the domain is locked by the faulting process. If so, the RCM proceeds to step 427. If not, the RCM proceeds to step 426 to determine if the domain is locked or guarded, if context switching is occurring, if a time out condi- tion has occurred or if the fault list is not empty. If any of these situations is true, the RCM proceeds to step 431 where it determines if the domain is locked by another process. If not, it proceeds to step 429. If so, the fault handler signals the process that has the domain locked, so that it can unlock the domain to let the faulting process run. The fault handler then proceeds to step 429 where the current rendering context for the process for the domain is put on the fault list. In other words, the rendering context is put on the fault list so that it can be switched onto the domain at a later time. If the conditions in step 426 are not true, the RCM proceeds to step 427 to determine if the domain was suspended with the rendering context that is owned by the faulting process; this can occur, for example, when a process locks and then unlocks a device, which locks and unlocks the domain, but never switches the context on that domain. If not, in step 428, the RCM switches the domain context to the current rendering context for the process that faulted. If so, the RCM proceeds to step 430 to immediately authorize access to the domain for the process and indicate the domain is on longer suspended, and then the RCM is exited.

FIG. 23 is a flow chart for the timer handler. In step 441, it is determined whether the current context has run long enough; the decision can be based on a number of factors, such as simply the clock time the process has owned the domain, or the number of CPU cycles the process has run while owning the domain, etc. If not, the timer is restarted in step 442 and the RCM is exited. If so, the RCM proceeds to step 443 where the RCM provides an indication that the domain timer has been turned off. In step 444, it is determined whether there are other processes that are waiting to lock or guard the domain. If so, in step 445, these processes are awakened (activated) and the timer handler is exited. If not, in step 446, it is determined if the domain is not guarded, not locked and the fault list is not empty. If this is true, the RCM proceeds to step 447 to dispatch the next process from the fault list. If none of this is true, the timer handler is exited.

In FIG. 24, the flow chart for the exit handler is illustrated. The exit handler is called when a process is ending voluntarily or terminated involuntarily. This means that all remnants of this process must be removed from the RCM. In the preferred embodiment, the exit handler is called for any state change. In step 461, it is determined if this state change is a change to an exit state. If not, the handler is exited. If so, in step 462, all the resources that were used by the process are now freed by a kill process module. The handler is then exited. Kill process is illustrated in FIG. 7.

The heavy switch controller is illustrated in flow chart form in FIG. 25. The heavy switch controller is effectively operating in a loop. In step 481, it is determined whether or not the exit flag has been set. If so, the heavy switch controller is exited. If not, the heavy switch controller proceeds to step 482 where the it waits for a queue element, which contains a command. The heavy switch controller requires a queue because it is possible that in a multi-device or domain environment it could be requested to do a second and third, etc., heavy rendering context switches before it finishes with a first. In the preferred embodiment, the command from the queue is going to be one of two: switch or exit. If it is a switch command, in block 483, the RCM calls a device specific end switch module. The end switch module implements the device specific tasks that are time consuming (such as starting a DMA operation and then going to sleep waiting for the conclusion of the DMA operation). When the device specific end switch is complete, the RCM proceeds to step 484 to perform the device independent functions required to complete a rendering context switch; this includes setting the current context for the domain, starting the domain timer, setting flags, etc. If the command received is an exit, then the RCM proceeds to step 485 which sets the exit flag. This would result in the heavy switch controller process being exited.

Figures 26, 27:
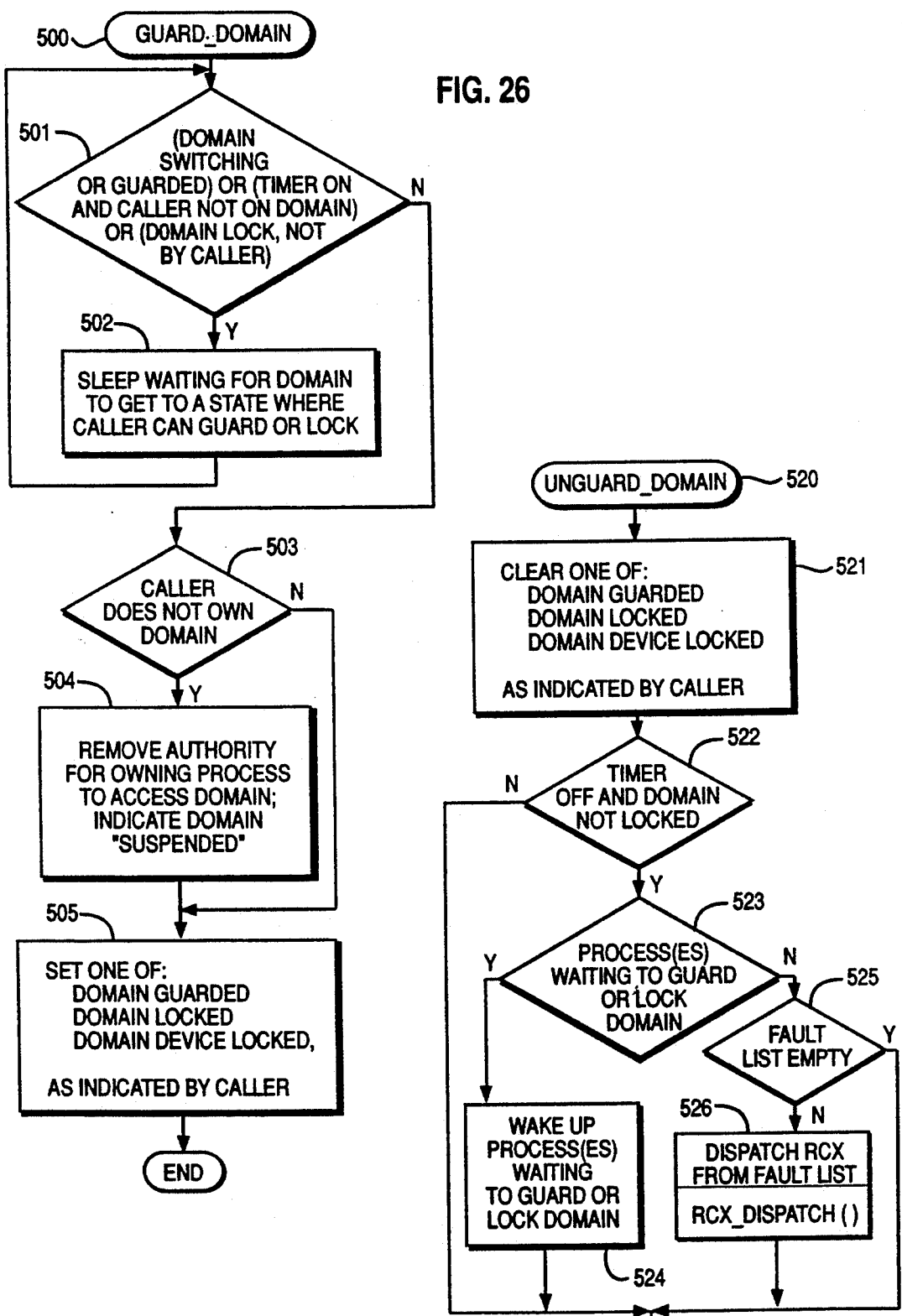
FIG. 26 is a flow chart of the guard domain module.
FIG. 27 is a flow chart of the unguard domain module.

In FIG. 26, a flow chart of the guard domain function is illustrated. The guard domain function guards, domain locks, or device locks a domain on a device. In step 501, the RCM determines if the domain is in the midst of a context switch or is already guarded by another process, or if the timer is on and the caller does not already own that domain, or whether the domain is locked by a process other than the caller. If any of these conditions are true, the RCM proceeds to step 502 where the process sleeps until the domain gets into a state where the caller can guard or lock the domain, i.e., where all of these conditions disappear. If not, the RCM proceeds to step 503 to determine whether or not the caller already owns the domain. If so, the RCM proceeds to step 505. If not, the RCM proceeds to step 504 to remove authority to access the domain from the process that owns it, and to indicate that the domain is suspended (i.e., the domain is guarded or locked with a context on the domain not owned by the process that has the domain guarded or locked). In step 505, the RCM sets flags in the domain entry in the domain array in the device structure indicating one of the following: either the domain is guarded, the domain is domain locked, or the domain is device locked. Which of the three is indicated by the caller. The handler is then exited.

In FIG. 27, the unguard domain module is illustrated in flow chart form. In step 521, the RCM clears either the domain guarded, the domain locked or the domain device locked flag, as indicated by the caller. In step 522, a decision is made whether or not the domain timer is off and the domain is not locked. If the timer is going or the domain is locked, the module exits. If the timer is off and the domain is not locked, the RCM proceeds to step 523 to determine if there are processes waiting to guard or lock the domain. If so, the RCM proceeds to step 524 to wake up the processes waiting to guard or lock the domain, and the module returns. If not, the RCM proceeds to step 525 to determine if the fault list is empty. If the fault list is empty, the module exits because there is not rendering context to switch to. If not, the RCM proceeds to step 526 to dispatch the next rendering context on the fault list. The handler is then exited.

Figure 31:
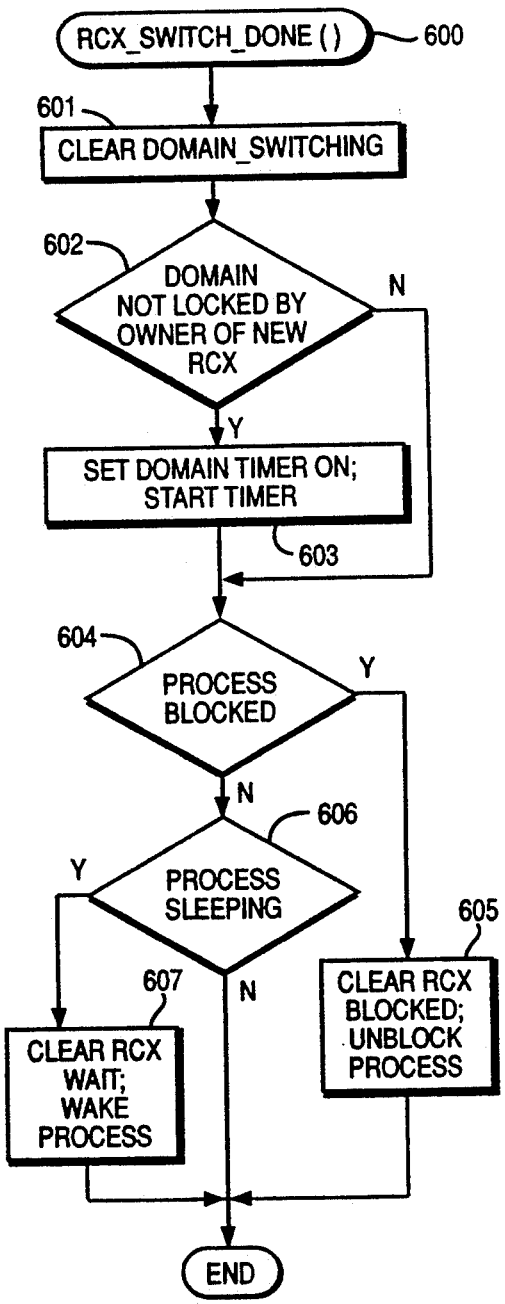
FIG. 31 is a flow chart of the rendering context switch done module.

FIG. 28 is a flow chart illustrating the rendering context switch module, an internal function. In step 540, an indicator is set indicating that the domain switching is occurring and any domain suspended indications are cleared: this prevents any attempts to start additional contexts switches for the domain. In step 421, we determine if the process that we are switching to owns the context that is already on the adapter. If so, the RCM proceeds to step 543. If not, the RCM goes to step 542 to remove the authority to access the domain for the process that does own the current context on the domain and gives the authority to access the domain to the process owning the new rendering context. In step 543, the current rendering context is set for the domain in the domain entry in the domain array for the device structure, and the priority of the new rendering context is adjusted (degraded in the preferred embodiment). In step 544, the RCM calls a device specific START$_{13}$-SWITCH() function that performs the device specific actions required to start a rendering context switch, and determines how much work this context switch will involve. This function is a device driver module that is specific for the device in use. In step 545, it is determined whether this switch is a light switch (not much work involved). If so, then START$_{13}$SWITCH() completed all the actions necessary to complete the context switch, and the RCM proceeds to step 546 to finish the switching and to call the rendering context switch done routine (FIG. 31) which performs all the device independent actions required to complete a context switch. The module is then exited. If the process is a heavy switch (will require a lot of time), then the RCM proceeds to step 547 to determine if the rendering context switch module has been called from an interrupt level (i.e., from one of the handlers). If so, the RCM proceeds to step 548 to set the rendering context as blocked, block the process and enqueue a context switch command to the heavy switch controller. The module is then exited. If the rendering context switch module was not called from a handler, the RCM proceeds to step 549 to call the device specific END$_{13}$SWITCH() module, which performs all the actions required to complete the rendering context switch for the domain. This function is a device driver module that is specific for the device in use. In step 550, the RCM calls the rendering context switch done module to perform the device independent actions required to complete a context switch(FIG. 31). The module is then exited.

FIG. 29 is the rendering context dispatch module flow chart. In step 561, the domain switching indication is set and the domain suspended indicator is cleared. In step 562, RCM removes the first (highest priority) rendering context from the domain fault list, to begin a context switch to it. In step 563 we determine if any process currently owns the domain. If not, the RCM proceeds to step 565. If so, the RCM proceeds to step 564 to remove the authority to access the domain from the process owning the domain and to adjust (lower in the preferred embodiment) the priority of the rendering context that is currently on the domain. In step 565, the RCM gives the authority to access the domain to the process that owns the new rendering context, and records the rendering context as the current rendering context for the domain in the domain entry in the domain array of the device structure. In step 566, the device specific $START_{13}SWITCH()$ is called to start the actual context switching and to determine how much work is involved. In step 567, it is determined whether it is a light switch. If it is a light switch, the RCM proceeds to step 568 to finish the switch by executing the rendering context switch done module. Returning to step 567, if the switch is not a light switch (being a heavy switch) the RCM proceeds to step 569 to determine if this rendering context dispatch module was called from an interrupt level. If so, the RCM enqueues a context switch command to the heavy switch controller in step 570 and the function is exited. If not, the RCM proceeds to step 571 to call the device specific switch done module, which completes the device specific actions required for a context switch. In step 572, the function performs the device independent actions for completing a rendering context switch by calling the rendering context switch module. The module is then exited.

Figure 30:
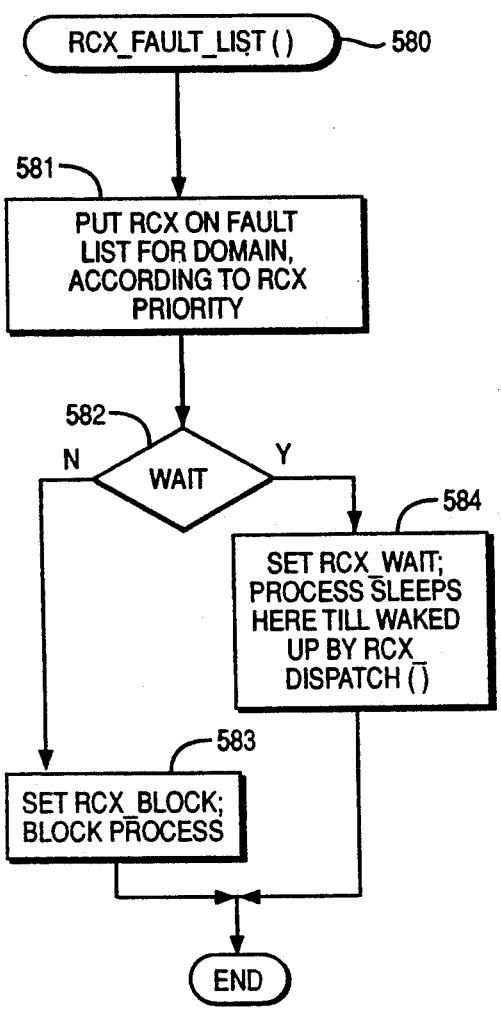
FIG. 30 is a flow chart of the rendering context fault list module.

FIG. 30 is a flow chart illustrating the rendering context fault list function. In step 531, the rendering context is placed on the fault list for the domain according to the rendering context priority. This includes searching through all the rendering context already on the list to determine the proper location for the new rendering context that we are placing on the list according to its priority relative to the priorities of the rendering contexts already on the list. Then in step 552, it is determined whether or not the process is to wait. If not, the RCM proceeds to step 583 to set a blocked indicator in the rendering context structure and then blocks the process owning the rendering context (this happens when called from the graphics fault handler). The function is then exited. If the process is to wait rather than be blocked, the RCM proceeds to step 584 to set a waiting indicator in the rendering context structure, and sleep until the process is awakened by the rendering context dispatch module. The function is then exited.

FIG. 31 is a flow chart illustrating the rendering context switch done module. In step 601, the domain switching flag is cleared. Then in step 602, it is determined whether the domain is locked by the owner of the new rendering context. If it is locked by the owner of the new rendering context, the RCM proceeds to step 604. If it not locked by the owner, the RCM proceeds to step 603 to indicate in the domain entry in the domain array for the device that the domain timer is on, and start the domain timer. In step 604, it is determined whether the process is blocked. If so, the RCM proceeds to step 605 to clear the rendering context blocked indicator and unblock the process; this allows the operating system to run the process. The rendering context switch done process is then exited. Returning to step 604, if the process is not blocked, the RCM proceeds to step 606 to determine if the process is sleeping (waiting). If so, the RCM proceeds to step 607 to clear the rendering context waiting indicator and to wake the process. The rendering context switch done process is then exited. If not, the rendering context switch done module is exited.

Figure 32:
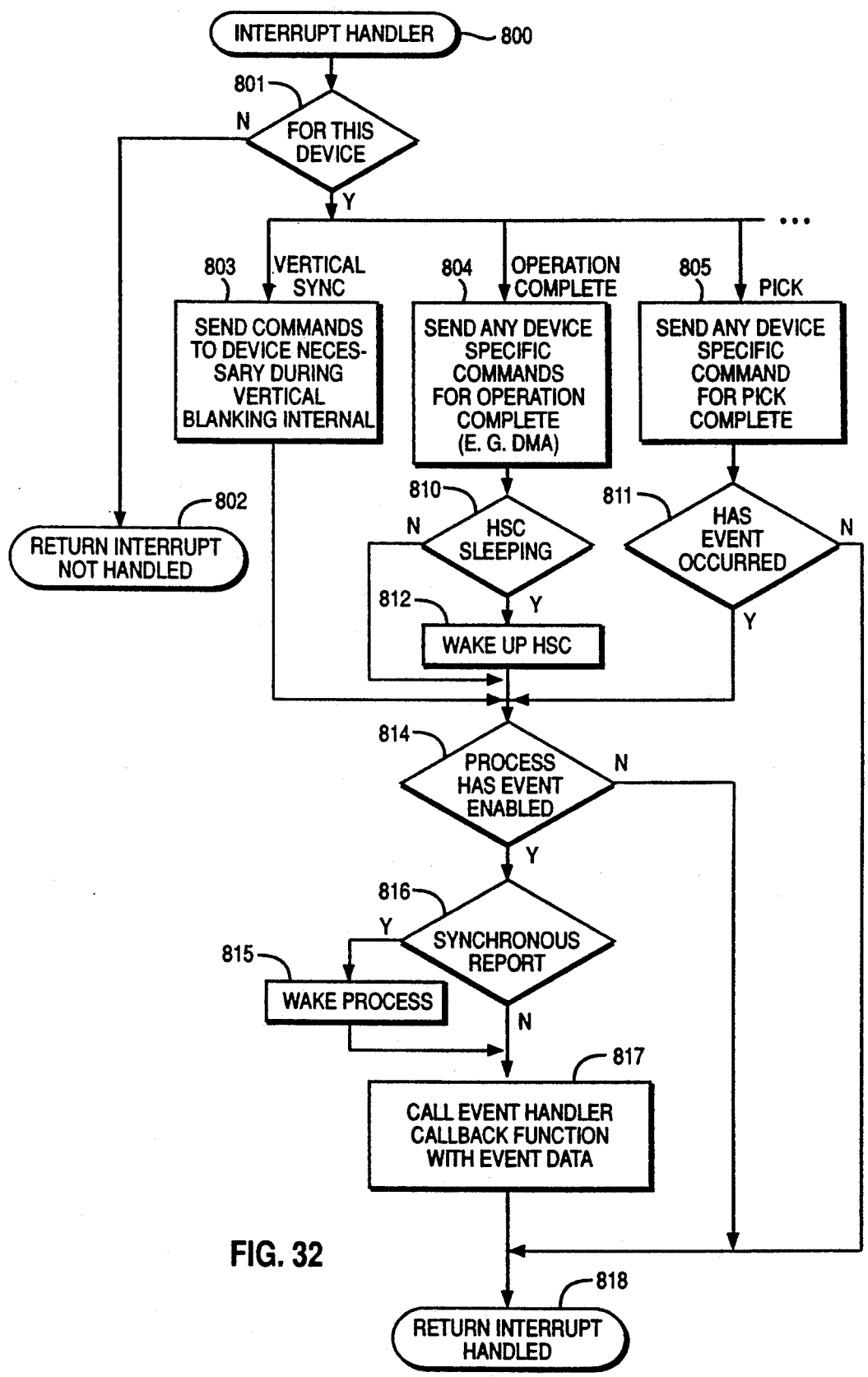
FIG. 32 is a flow chart of the interrupt handler.

FIG. 32 is a flow chart illustrating an interrupt handler structured to work with the RCM and an event handler associated with the RCM. Such an interrupt handler is quite device specific, but FIG. 32 provides an example for how such an interrupt handler should be structured. This interrupt handler in FIG. 32 is termed a "second level interrupt handler", since it is called by the first level interrupt handler that actually first deals with the interrupt signal. In step 801, the handler determines if the cause of the interrupt is one that is to be addressed by the interrupt handler (for the device serviced by the interrupt handler). If not, the handler proceeds to step 802 to indicate that the interrupt is not to be handled by this interrupt handler and the handler is exited. After step 801, if the interrupt cause is one to be handled by this interrupt handler, it then proceeds to the determine the specific cause, usually by reading status from the device. The causes of interrupts from a device depend very much on the specific device. The causes illustrated in FIG. 32 are examples common to many display devices. The first cause 803 is that the device vertical synchronization period has started. Many display device require certain operations, such as loading a color lookup table, to be performed during the vertical synchronization period to prevent anomalies from being visible to the user. This is a device dependent condition since some devices do not require any processing during the vertical synchronization period. Upon the completion of this processing, the handler proceeds to step 814. In step 804, the cause generating the interrupt would indicate that some device operation is complete. This would include operations such as a DMA operation or a bit block transfer operation; again the interrupt handler would perform any actions necessary to service the interrupt. For a device that requires DMA operations to perform context switching, the interrupt handler, in step 810, would determine if the heavy switch controller is waiting on the completion of the DMA operation; if so the handler wakes up the heavy switch controller and proceeds to step 814. In step 805, the cause of an interrupt is a pick interrupt, and once again the interrupt handler performs device specific actions to service the interrupt; this would include retrieving the pick information from the device and saving it in a buffer supplied by the event handler (see FIGS. 33, 34, 35, 36, 37 38, 39). At step 811, the handler determines if the pick interrupt also indicates that a pick event (all picking has been completed) has occurred. If not, the handler proceeds to step 818. If so, the handler proceeds to step 814. Note that the three specific interrupts shown are representative of general classes of interrupts. The vertical synchronization interrupt may require data be output to the device. The operation complete interrupt requires that the heavy switch controller be awakened under certain circumstances. The pick interrupt servicing shows how not all interrupts get interpreted as events. Those of skill in the art can understand that other interrupt conditions such as those conditions in 803, 804, and 805 may be included in this interrupt handler. At step 814, the interrupt handler determines if a process wishes to be notified about the event that just occurred; the event handler notifies the interrupt handler about which events the process wishes to know about via calls to device specific routines that communicate with the interrupt handler (see FIGS. 34 and 38). If the process does not wish to know about the event, the handler proceeds to step 818. If the process wishes to know about the event, the handler, in step 816, determines if the process requested synchronous notification. If so, in step 815, the handler wakes up the sleeping process and proceeds to step 817. If not the handler simply proceeds to step 817, in which the handler calls the callback function supplied by the event handler (see FIG. 39) to record the event information in the RCM event data structures (see FIG. 33). The handler proceeds to step 818 to indicate that the interrupt has been handled and then the handler is exited.

Figure 33:
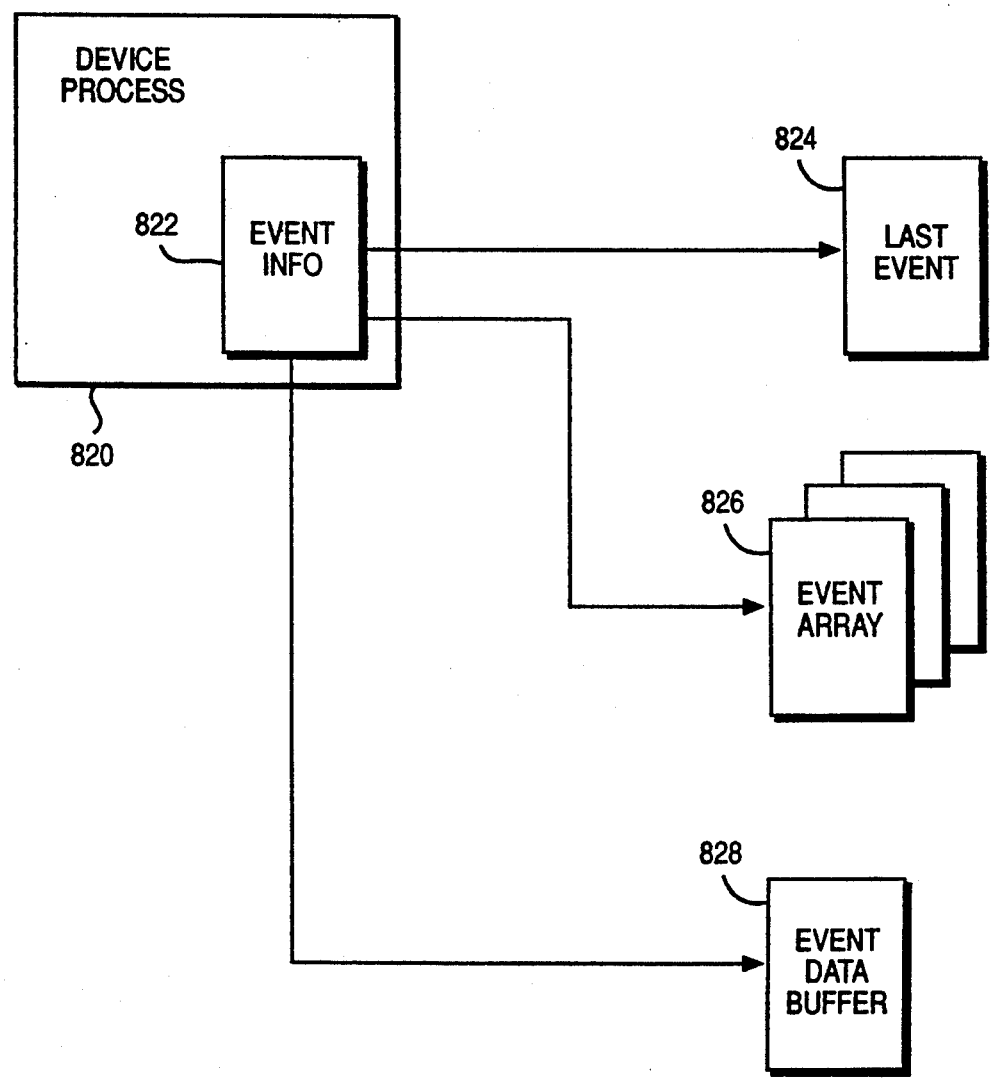
FIG. 33 is a block diagram illustrating the rendering context manager data structures associated with event handling.

FIG. 33 shows the data structures associated with event handling. First, a distinction must be made between an interrupt, as handled by the interrupt handler in FIG. 32, and an event, as managed by the event handler described in FIGS. 34, 35, 36, 37, 38, and 39. An interrupt is an interruption of the normal CPU instruction flow caused by a device generating an electrical signal that is detected by the CPU; an interrupt handler must deal with all enabled interrupts. An event is a logical happening about which an application process wishes information, for example, that it happened, and any data associated with the event. One must make the distinction because not all interrupts are events. Consider the vertical synchronization interrupt; in many cases, a process does not want to know about it at all; however, to perform certain actions that must be synchronized with the vertical blanking interval, the application wishes to wait for the vertical synchronization interrupt: in this case it becomes an event. As another example, consider a pick operation for adapters that must buffer pick hits (when a graphical object such as a line falls within an application process defined pick space) and interrupt when the buffer is full so that the interrupt handler can read the buffer; eventually the application process ends the pick operation, and the device will generated yet another pick interrupt, this time with an indication that the pick is finished; in such cases, the application process does not want to know about all the intermediate pick interrupts, but does wish to know about the pick complete event. A process may treat events as either synchronous or asynchronous occurrences. For synchronous events, the process requests the event handler to make the process wait (sleep) until the event occurs. For asynchronous events, the process requests the event handler to notify the process when the event occurs, and the process continues to do other work without waiting on the event: a signal mechanism common to multi-tasking operating systems is used for the asynchronous notification. For example, a process can make the graphics system call to tell the event handler that it wishes to treat some event asynchronously. After the return from the system call, the process can continue doing work, such as traversing data structures, making calculations, etc. When the event occurs, the event handler signals the process, which must have defined a signal handler (an application function that operates out of the main stream of instruction processing; some what like a software interrupt handler); the operating system delivers the signal to the process signal handler, which may set some flag in a data structure accessible to both the signal handler and the main part of the application process. The process can periodically check that flag, and when it finds it set, can call the event handler to find out what event occurred.

Returning to FIG. 33, the device process block 820, which corresponds to the device process block 62 in FIG. 5, contains the event infostructure 822, which acts as the anchor location for all event information for the process for the device corresponding to the device process block 820. The event info structure 822 contains a link to the last event structure 824; this structure contains fields that identify the last synchronous event and a small amount of information from the event. The event info structure 822 contains a link to the event array 826 the size of which is application process determined. Each entry in the event array 826 contains the same information as the last event structure 824; the event array is used to record information about events reported asynchronously to the application process; an array is required because the process can request to have several events reported asynchronously, and more than one can occur between the time the event handler signals the process and the process actually reads the event information from the event array 826. Finally the event info structure 822 contains a link to the event data buffer 828. This buffer, of a size requested by the application process, is used to hold large amounts of data from certain types of events, such as a pick operation. It is created and destroyed dynamically by the event handler at the request of the application process to minimize the resources needed for event handling.

FIG. 34 illustrates a flow chart for the $ASYNC_{13}EVENT$ module, which a process calls to indicate the events about which it wishes asynchronous notification. In step 830, the event handler determines if the calling process has requested no events. If so, in step 832, the event handler calls the device specific $ASYNC_{13}MASK()$ to disable reporting of any events asynchronously, then in step 834, the event handler frees all storage used to hold the event array, and then returns. If in step 830, the process has requested to be notified about one or more events asynchronously, in step 836, the event handler allocates and pins storage for an event array of a size requested by the application process, and links the event array to the event info structure in the device process structure. Then in step 838, the event handler calls the device specific $ASYNC_{13}MASK()$. passing the address of the event handler CALLBACK function, to enable asynchronous reporting of the events requested by the application, and then returns.

FIG. 35 illustrates a flow chart for the $ENABLE_{13}INTR$ module, which a process calls to enable or disable display device interrupts. In step 840, the event handler calls the device specific $ENABLE_{13}INTS()$ to enable only those interrupts indicated by the application process, and disable all others. This allows interrupts to occur without reporting them as events.

FIG. 36 illustrates a flow chart for the $EVENT_{13}BUFFER$ module which a process calls to create an event buffer for the reporting of large amounts of data from an event. In step 850, the event handler checks to see if a buffer currently exists. If so, since the event handler can deal with only one buffer, in step 850, it unpins and frees that buffer, and proceeds to step 854. If not, in step 854, the event handler allocates an pins an event buffer of the size requested by the application process and links it to the event info structure in the device process structure.

Figure 37:
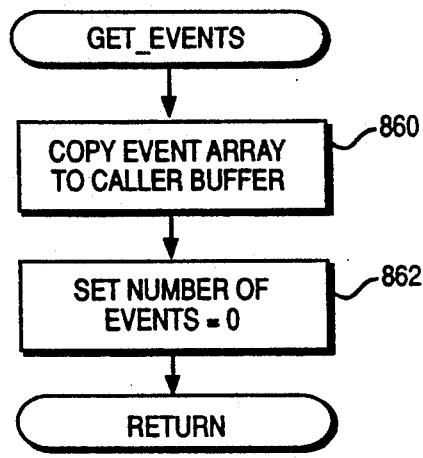
FIG. 37 is a flow chart of the get events (GET$_{13}$EVENTS) module.

FIG. 37 illustrates a flow chart for the GET₁₃EVENTS module, which a process calls to retrieve the information about asynchronous events that have occurred. In step 860, the event handler copies all the valid entries in the event array into a buffer provided by the application process. In step 862, it sets the number of events to zero, to mark that all events have been received by the application process, and returns.

Figure 38:
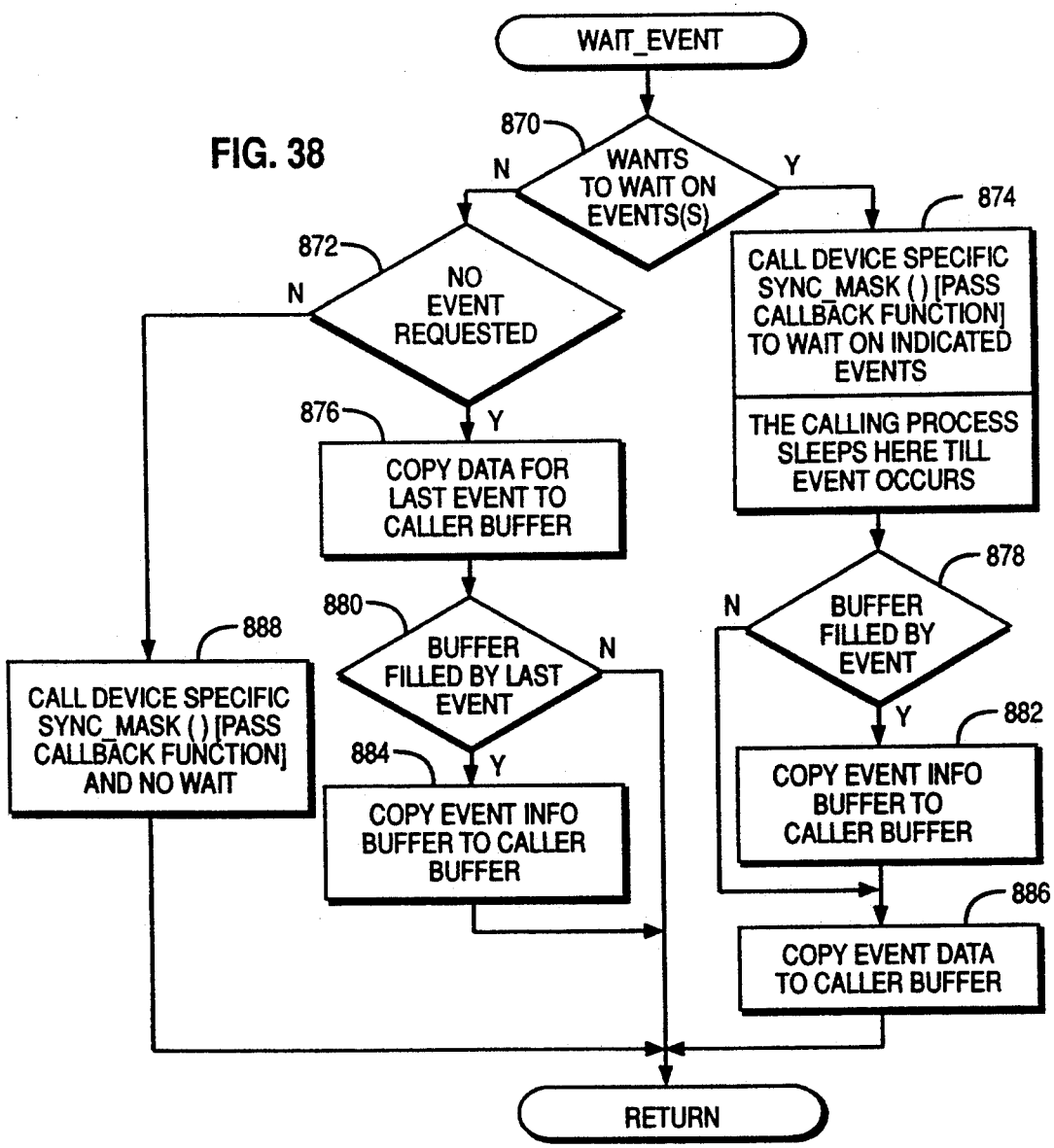
FIG. 38 is a flow chart of the wait events (WAIT$_{13}$EVENTS) module.

FIG. 38 illustrates a flow chart for the WAIT₁₃EVENT module, which a process calls to wait on synchronous events and to retrieve the event buffer, etc. In step 870, the event handler determines if the calling process wants to wait on an event. If so, in step 824, it calls the device specific SYNC₁₃MASK(), passing as parameters the events upon which the process wishes to wait and the event handler CALLBACK function, used by the interrupt handler to report events to the event handler; the calling process sleeps until awakened by the interrupt handler when one of the events occurs. Then in step 878, the event handler checks to see if an event buffer was filled by the event. If so, in step 882, the event handler copies the event buffer into the buffer provided by the application process, and proceeds to step 886. If not, it proceeds to step 886. In step 886, the event handler copies the event information. e.g., the event type, and any small amount of data from the event, into a buffer provided by the calling process; this allows the process to determine which event of the several it could be waiting upon actually occurred. Returning to step 870, if the calling process does not wish to wait on events, the event handler proceeds to step 872, where is determines if the calling process wishes to know about any events. If so, it proceeds to step 888, where it calls the device specific SYNC₁₋₃MASK(), passing the events the calling process wants to know about, and the address of the CALLBACK() function (see FIG. 39) so that the interrupt handler can inform the event handler about the events, and then returns. Returning to step 872, if the calling process has requested to be notified about no events, which means the processes wishes to retrieve event data, then in step 876, the event handler copies the last event structure into a buffer provided by the calling process. In step 880, the module determines if the event has an event buffer associated. If not, the module returns. If so, in step 884, the module copies the event buffer into a buffer provided by the application process, and then returns.

Figure 39:
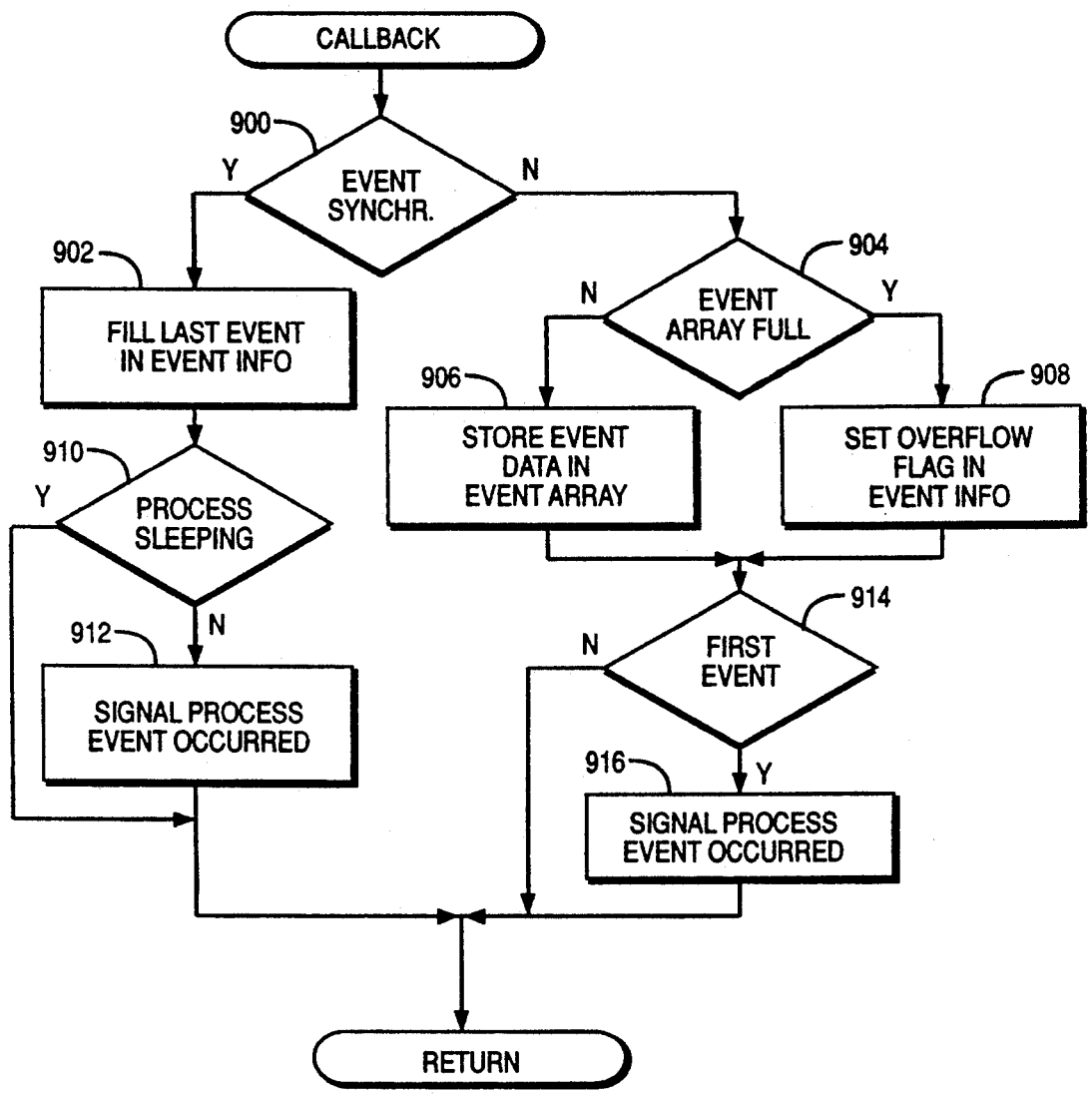
FIG. 39 is a flow chart of the event handler callback function (CALLBACK) module.

FIG. 39 illustrates a flow chart for the CALLBACK module, which a device interrupt handler calls to inform the event handler about events, either synchronous or asynchronous. In step 900, the callback module determines if the event is to be reported synchronously or asynchronously. If synchronously, in step 902, the callback module copies the event information passed to it by the interrupt handler into the last event structure. Then in step 910, the callback module determines a process is waiting (sleeping) for the event. If not, the module returns. If so, then in step 912, the callback module signals the process to inform it that the event has occurred, and returns. Returning to step 900, if the event is to be reported synchronously, the callback module, in step 904 determines if the event array is full. If so, in step 906, the module sets a flag indicating that the event array overflowed and then goes to step 914. If not, the module stores the information about the event in the event array and goes to step 914. In that step, the callback module determines if this event is the first in the event array. If not, the module returns. If so, in step 916, the module signals the process, to indicate that the event occurred, and then returns.

While the invention has been described with reference to the illustrated embodiment, this description is not intended to be construed in a limiting sense. Various modifications of the illustrated embodiment, as well as other embodiments of the invention, will become apparent to those persons skilled in the art upon reference to this description. It is, therefore, contemplated that these appended claims will cover any such modifications or embodiments as fall within the true scope of this invention.

I claim:

1. In a data processing system for executing a process and providing an interrupt signal upon an occurrence of a predetermined event related to a device under the control of the process and having an interrupt manager comprising:

means for receiving the interrupt signal and extracting from the interrupt signal, interrupt data indicative of the occurrence of the interrupt signal, an interrupt identification and interrupt event data to indicate whether the interrupt signal is considered to be an event;

means for storing a predetermined criteria from the process, said criteria determining whether said event data is to be provided to the process;

means, connected to the receiving means, for interpreting the interrupt data and determining, based on the predetermined criteria, if an event signal is to be provided to the process based on such interpretation; and interrupt handler means for sequentially servicing all of said interrupt signals in the order in which they are received, and for providing the event signal to the process only when indicated by the interpreting means.

2. An interrupt manager according to claim 1 wherein said interrupt manager storing means further includes means for receiving the predetermined criteria from the process.

3. An interrupt manager according to claim 2 further including means, connected to the interrupt signal receiving means, for storing a history of previously received interrupt signals in a first buffer.

4. An interrupt manager according to claim 3 further including means, connected to said history storing means, for selectively transferring contents of said first buffer to said process.

5. An interrupt manager according to claim 4 further including means for detecting when the first buffer is full and means for transferring the contents of said first buffer to said process when said first buffer becomes full.

6. An interrupt manager according to claim 5 further including means, connected to said interrupt receiving means, for storing a last interrupt signal with related interrupt data in a second buffer.

7. An interrupt manager according to claim 2 wherein said predetermined criteria includes status information indicating a current status of the process.

8. In a data processing system for executing a process and providing an interrupt signal upon an occurrence of a predetermined event related to the process, a method for processing said interrupt signals comprising the step of:

receiving the interrupt signal from a device within the system and extracting from the interrupt signal, interrupt data indicative of the occurrence of the interrupt signal, an interrupt identification and interrupt event data to indicate whether the interrupt is considered to be an event;

storing a predetermined criteria from the process, said criteria determining whether said event data is to be provided to the process;

interpreting data the interrupt and determining, based on the predetermined criteria, if an event signal is to be provided to the process based on such determination;

sequentially servicing all of said interrupt signals in the order in which they are received; and providing the event signal to said process only when indicated by the interpretation of the interrupt data based on the predetermined criteria.

9. The method of claim 8 further including the step of receiving the predetermined criteria from the process indicating a status of the process.

10. The method of claim 9 further including the step of storing a history of previously received interrupt signals in a first buffer.

11. The method of claim 10 further including the step of selectively transferring contents of said first buffer to said process.

12. The method of claim 11 further including the step of determining when the first buffer becomes full and the step of transferring the contents of said first buffer to said process when said first buffer becomes full.

13. The method of claim 12 further including the step of storing a last interrupt signal with related interrupt data in a second buffer.

* * * * *